United States Patent
Murphy

(10) Patent No.: US 9,305,163 B2
(45) Date of Patent: *Apr. 5, 2016

(54) USER, DEVICE, AND APP AUTHENTICATION IMPLEMENTED BETWEEN A CLIENT DEVICE AND VPN GATEWAY

(71) Applicant: Mocana Corporation, San Francisco, CA (US)

(72) Inventor: Daniel Murphy, Bolton, MA (US)

(73) Assignee: Mocana Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,892

(22) Filed: Oct. 20, 2014

(65) Prior Publication Data

US 2015/0052595 A1 Feb. 19, 2015

Related U.S. Application Data

(63) Continuation-in-part of application No. 14/459,976, filed on Aug. 14, 2014, now Pat. No. 8,997,208.

(60) Provisional application No. 61/918,464, filed on Dec. 19, 2013, provisional application No. 61/866,320, filed on Aug. 15, 2013.

(51) Int. Cl.
*H04L 29/06* (2006.01)
*G06F 21/54* (2013.01)
(Continued)

(52) U.S. Cl.
CPC ............... *G06F 21/54* (2013.01); *G06F 21/44* (2013.01); *H04W 12/08* (2013.01); *H04L 63/0272* (2013.01)

(58) Field of Classification Search
CPC ...... H04W 12/08; H04W 12/06; H04L 63/02; H04L 63/0227; H04L 63/0272; H04L 63/08; H04L 63/0823; H04L 63/0884; H04L 63/102; H04L 63/107; G06F 21/51; G06F 21/56; G06F 21/44; G06F 21/54
USPC ............................................................ 726/1
See application file for complete search history.

(56) References Cited

U.S. PATENT DOCUMENTS 6,308,212 B1 10/2001 Besaw et al.
6,363,081 B1 3/2002 Gase
(Continued)

OTHER PUBLICATIONS

U.S. Office Action dated Oct. 10, 2014 from U.S. Appl. No. 14/459,976.
(Continued)

*Primary Examiner* — Kambiz Zand
*Assistant Examiner* — Noura Zoubair
(74) *Attorney, Agent, or Firm* — Beyer Law Group LLP

(57) ABSTRACT

An application executing on a device is authenticated by an enterprise gateway components. This authentication is done in addition to authenticating the device and user. This includes authenticating apps that are being used on the device. The enterprise, by virtue of the gateway component, can authenticate details about specific app usage. The enterprise gateway component establishes a dedicated link coupling the gateway device and a specific executing app. Prior to this app-specific link being established, the gateway device collects information and stores it in a database, including information about the user, device, and the specific application. Authentication is performed at each level.

6 Claims, 14 Drawing Sheets

(51) Int. Cl.
*G06F 21/44* (2013.01)
*H04W 12/08* (2009.01)

(56) References Cited

U.S. PATENT DOCUMENTS

| | | | |
|---|---|---|---|
| 6,374,359 | B1 | 4/2002 | Shrader et al. |
| 7,009,956 | B2 | 3/2006 | Heinonen |
| 7,031,275 | B1 | 4/2006 | Borella et al. |
| 7,320,027 | B1 | 1/2008 | Chang et al. |
| 7,596,804 | B2 | 9/2009 | Toomey et al. |
| 7,617,233 | B2 | 11/2009 | Guido et al. |
| 7,930,736 | B2 | 4/2011 | Crespo et al. |
| 8,095,786 | B1 | 1/2012 | Kshirsagar et al. |
| 8,132,242 | B1 | 3/2012 | Wu |
| 8,239,926 | B1 | 8/2012 | Lin et al. |
| 2006/0195547 | A1 | 8/2006 | Sundarrajan et al. |
| 2008/0201486 | A1 | 8/2008 | Hsu et al. |
| 2009/0328192 | A1 | 12/2009 | Yang et al. |
| 2011/0083174 | A1 | 4/2011 | Aldridge et al. |
| 2012/0005476 | A1 | 1/2012 | Wei et al. |
| 2012/0240183 | A1* | 9/2012 | Sinha ............................... 726/1 |
| 2014/0026179 | A1* | 1/2014 | Devarajan et al. ................ 726/1 |

OTHER PUBLICATIONS

International Search Report dated Nov. 21, 2014 from International Application No. PCT/US2014/051139.
Written Opinion dated Nov. 21, 2014 from International Application No. PCT/US2014/051139.
U.S. Appl. No. 14/459,976, filed Aug. 14, 2014.
Avvenuti et al., "*Application-level network emulation: the EmuSocket toolkit*," Journal of Network and Computer Applications 29 (2006) 343-360.
Bajko et al., "*Port Restricted IP Address Assignment*," IETF Internet Draft Standard, Sep. 2012, 19 pages.
Ford et al., "*Issues with IP Address Sharing*," Internet Engineering Task Force (IETF), Jun. 2011, 30 pages.
Liu et al., "*A Secure Cookie Protocol*," Computer Communications and Networks, 2005. ICCCN 2005. Proceedings. 14th International Conference on, Oct. 17-19, 2005, 333-338.
Reitz, "*The Dynamic Port Reservation Protocol*," Thesis, Submitted in partial fulfillment of the requirements for the degree of Master in Computer Science in the Graduate College of the University of Illinois at Urbana-Champaign, 2001, 56 pages.

\* cited by examiner

Active Session Query [ 2 users are active ]

kwante ◆ ▽Show

Session Data for kwante — 1102

| Username | Group | Login Time | Duration | Auth Provider |
|---|---|---|---|---|
| kwante | wheel | 2014-07-08  17:29:23 | 7 seconds | reconnectToken |

— 1104

Devices Used

| Device | Hardware Type | OS Type | OS Version | Carrier Name |
|---|---|---|---|---|
| F414ACE3-653D-41C1-86BA-61FF801B389C | iPhone3,1 | ios | 7.1.2 | AT&T |

— 1106

Applications Used

| Device | Application | Package ID | MAP Version | UUID | Session ID |
|---|---|---|---|---|---|
| F414ACE3-653D-41C1-86BA-61FF801B389C | Compass Browser | com.mocana.SecureMAPBrowser | master Release build #42000000-dev (2012-07-12_12-17-27) | 19B81319-E4A3-4E61-8DE7-0D334B5573AA | 0xbc458646a0 |
| F414ACE3-653D-41C1-86BA-61FF801B389C | NSLookup | com.dayananetworks.nslookup | release Release build #482 (2014-07-02_18-14-48) | F09F8851-7120-4519-8F51-AB1B0E8B1822 | 0xbc45881f40 |

USER, DEVICE, AND APP AUTHENTICATION IMPLEMENTED BETWEEN A CLIENT DEVICE AND VPN GATEWAY

CROSS-REFERENCE TO RELATED APPLICATIONS

This application claims priority under U.S.C. §119(e) to U.S. Provisional Application No. 61/918,464, filed Oct. 19, 2013, entitled "USER, DEVICE, AND APP AUTHENTICATION IMPLEMENTED IN A VPN GATEWAY" by Murphy, and is a Continuation-in-Part of U.S. patent application Ser. No. 14/459,976, filed Aug. 14, 2014, entitled "GATEWAY DEVICE FOR TERMINATING A LARGE VOLUME OF VPN CONNECTIONS" by Champagne et al. U.S. patent application Ser. No. 14/459,976 claims priority to U.S. Provisional Application No. 61/866,320, filed Aug. 15, 2013, entitled "METHOD AND SYSTEM FOR REPORTING A JAILBROKEN/ROOTED DEVICE AND TERMINATING MULTIPLE SECURE TUNNEL CONNECTIONS AT A GATEWAY COMPONENT" by Champagne et al. All of these applications are incorporated herein in their entireties.

BACKGROUND OF THE INVENTION

1. Field of the Invention

The present invention relates to software, computer network communications, and VPN gateway components. More specifically, it relates to security and authentication between apps on a client device and a VPN gateway.

2. Description of the Related Art

There is an increasing need for mobile security in enterprises that have users utilizing mobile devices and mobile apps for work or to access services behind the enterprise firewall. Although there is conventional software that provides for a VPN from a mobile device to a VPN gateway, the level of security is often insufficient and provides little information to the enterprise about enterprise-enabled app usage. In this conventional scenario, one VPN is used by all the data from all enterprise apps to the VPN gateway. In other words, the VPN is at the device level. Given the growing number of users executing work-related apps on their personal mobile devices and having to connect to work-related or enterprise-related services through a secure tunnel, having a single VPN pipe for all the data going to and from a mobile device to an enterprise VPN gateway does not provide the level of security needed to prevent hackers and other bad actors from stealing and manipulating the data or from planting malware on the mobile devices that could eventually harm enterprises.

A higher level of security would involve not having multiple apps (let alone an entire device) share a single VPN, in other words, not using a device-level secure VPN tunnel. A better level of security would be to have each app have its own dedicated VPN to a gateway, one that is secure and only transports data for that app or at least one that only transmits data for a federation of apps. In one scenario, each enterprise app on a personal mobile device has its own VPN connection to the enterprise gateway (operated by the user's employer, client, supplier, or the like).

Currently, a mobile app user can be authenticated by a gateway component using conventional means, such as Active Directory or any suitable authentication, authorization, and accounting (AAA) means. A device can be authenticated when the user attempts to access a network, such as an enterprise network, using the device. That is, when a user on a mobile device tries to log on to an enterprise network, the network authenticates that specific device. The network makes sure that the device is known and registered with the enterprise. It also ensures that the specific device is authorized to access the gateway. As such, the authentication stops there. That is, presently, networks are able to determine who the user is, in some cases where the user is, what the back-end security authentication means is (e.g., Active Directory, Radius, etc.) and which device the user is using to connect to the gateway. Conventionally, this information can be obtained and reported to an enterprise security administrator as needed. It would be desirable to have an authentication platform that goes beyond merely authenticating a client device and the device user. It would also be desirable to have richer, real-time data that extends beyond high-level device and user information.

SUMMARY OF THE INVENTION

In one aspect of the present invention, a method of authenticating an executing app on a mobile device is described. Issues of authentication at three levels are addressed: the user level, the device level, and the (wrapped) app level. The enterprise network performs three levels of authentication using the gateway. This includes authenticating apps that are being used on the device. The enterprise, by virtue of the gateway component, can authenticate details about specific app usage.

In one embodiment, a mobile device connects to a gateway component via Internet. Gateway component, in turn, is in communication with, for example, an Active Directory server and any other enterprise Web servers, such as certificate authority server. These servers are "behind" gateway in the enterprise network.

Once the connection between device and gateway is made, the process continues with IKE Phase 1 XAUTH which includes PERP parameters, such as challenge prompts, transmitted from gateway to device. Mobile device then sends its PERP parameters, including user credentials, device metadata, and app identification, back to gateway component. Gateway component then sends messages back to mobile device including configuration data and ticket.

BRIEF DESCRIPTION OF THE DRAWINGS

References are made to the accompanying drawings, which form a part of the description and in which are shown, by way of illustration, specific embodiments of the present invention:

FIG. 11 is a screen shot of a display showing a VPN gateway active session monitor screen in accordance with one embodiment;

DETAILED DESCRIPTION OF THE INVENTION

Figure 1A:
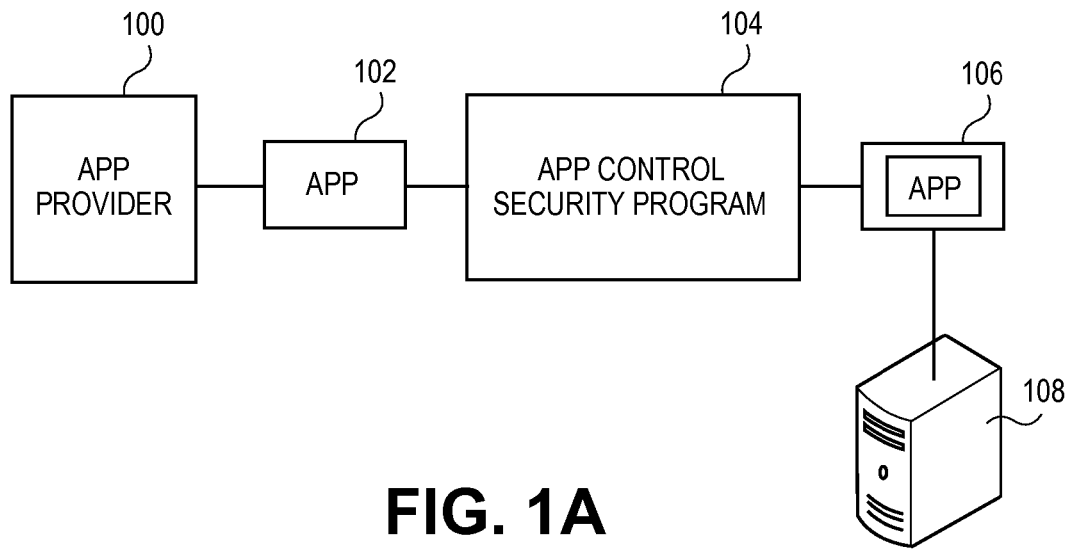
FIG. 1A is a block diagram showing an overview of the app control process of the present invention.

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for preventing device software applications from infecting or otherwise damaging a device, in particular, a mobile device, are described in the various figures. These types of applications, used often on a variety of mobile devices, such as smart phones, tablet computers, gaming devices, and portable computing devices are commonly referred to as "apps." These apps may also be downloaded on to non-mobile devices, such as TVs, computers, automobiles, and other emerging smart device categories. Methods and systems described are not intended to be limited to operation on mobile devices. These device programs or apps have proliferated and are now very prevalent. Currently, apps are typically written in either Java or C. The methods and systems described herein may be applied to apps written in either or to apps written in other languages for different platforms. Most apps, if not all, have to communicate with the mobile device's operating system to get a specific service that the app needs in order to perform its intended function and this service is usually only available from the operating system. A common example of such a service used is GPS to get the location of the device which the app may need. However, because of this exposure, apps are a vulnerability for the device and pose a security and privacy risk for the user. Companies want to be able enforce a centralized policy to control and secure access to its data and software. This is also true for end users (i.e., individuals, home users, and the like). It enables enterprise IT departments to maintain governance of corporate data. The methods described below provide a centralized way to control security with respect to apps that are downloaded onto mobile devices, where the devices are either an employee's personal phone or an employer's phone, so that those apps do not pose a security threat. Various embodiments of the invention may also be used by parents and individuals (i.e., in home or non-work environments) to ensure that their personal mobile devices are safe from malware and may also be used to apply controls, such as on usage. Embodiments of the app control software of the present invention may also be used for mobile device data protection and back-up and for application-level telemetry.

FIG. 1A is a block diagram showing an overview of the app control process of the present invention. It is a generic description of one process without being tied to a specific configuration or environment. An app 102 is provided by app provider 100 which can be any type of entity (individual, software developer, employer, etc.). It is generally unprotected and the only security surrounding it is provided by the operating system. The only shield and checking done on how it executes on the device once loaded is provided by the operating system.

The present invention enables additional security of the apps that is not provided by the device's operating system. A security application program 104 is applied to app 102. Or the app 102 is input to program 104, which may be supplied by a third-party app security provider. In one embodiment, security application program 104 has a policy manager and a policy wrapper which may be in different locations. They are described in greater detail in FIG. 2. Once security program 104 has been applied to app 102, the app is wrapped with a security layer so that the device is protected. It is shown as secured app 106. In one embodiment, secured app 106 is then downloaded onto a mobile device 108, such as a smart phone or tablet computer, where it executes securely without risking damage to device 108. Another benefit is that secured app 106 may also be managed by the company or other entity that is providing the app to the user, such as an employer providing the app to an employee. For example, if the user leaves the company, the company may automatically delete the app and any related data from the device. In another example, a parent may be able to limit the apps used by another person (e.g., a child) or to limit the amount of time, e.g., 10 minutes a day or limit which Web sites may be accessed by an app. Or, a parent is concerned that an app is leaking a child's location to unknown third parties. There may be numerous other examples. As noted, FIG. 1A is intended to show the general process of securing an app and downloading it onto a device. Note that in this embodiment, app 102 is not made secure from causing harm to the device after it is downloaded onto the device, but before. In another embodiment, the app is secured after it is downloaded onto the device, but before it can interact with the operating system.

Figure 1B:
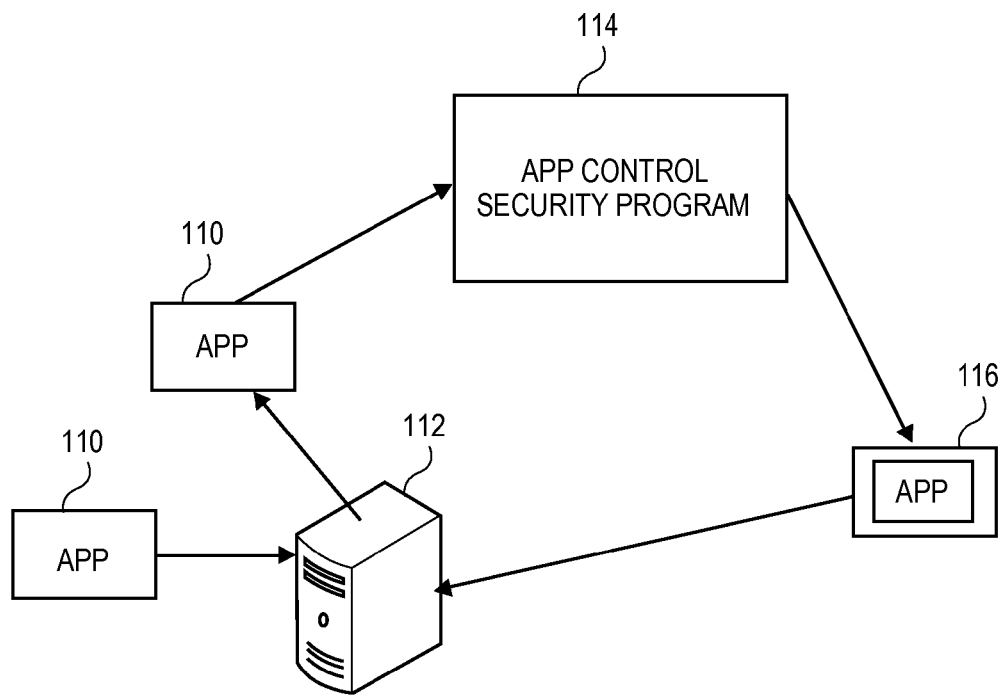
FIG. 1B is a block diagram showing an alternative embodiment of an app control process of the present invention.

FIG. 1B is a block diagram showing an alternative embodiment. An unsecured app 110 (also supplied by an app provider) is downloaded onto mobile device 112. In this embodiment, however, there may be a specially designed app on device 112 that blocks the actual installation of unsecured app 110. The special app (not shown) redirects unsecured app 110 to an app security program 114. The unsecured app 110 is wrapped in a security policy, the resulting app shown as secured app 116. It is then downloaded and allowed to be installed on device 112 by the special app. In this manner, an individual or home user, for example, who wants to protect her phone from security threats posed by apps, can have apps made secure (wrapped) by a third-party service or by her mobile phone carrier, to mention only two examples, before they are downloaded on to her phone. It should be noted that this security wrapping can be done to an app regardless of where the user downloads the app from. It may also be noted that in FIGS. 1A and 1B, the network and connections between the components and software are shown generically. The transmissions are primarily over the Internet (not shown) but may also be within a private network or both.

Figure 2:
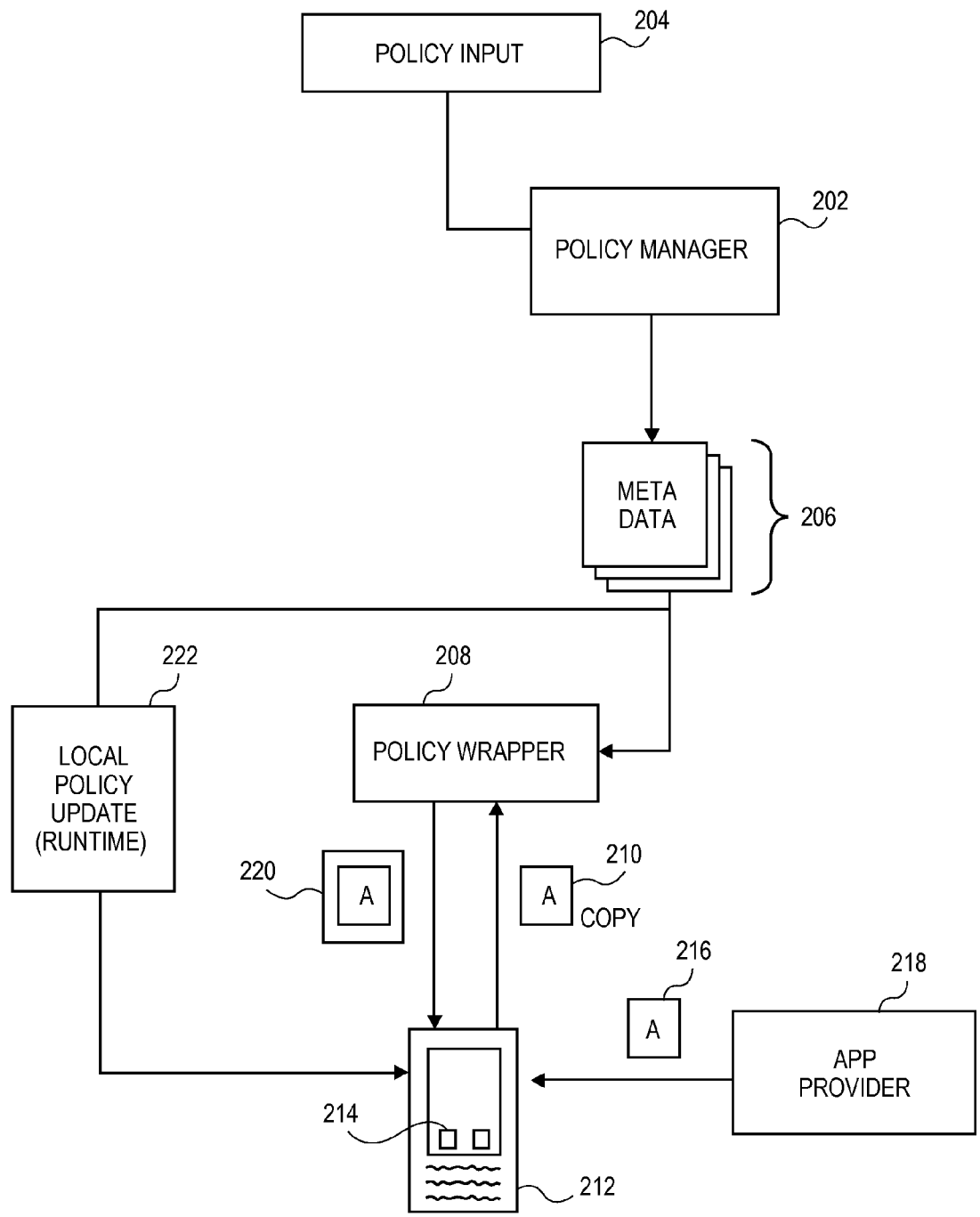
FIG. 2 is a block diagram showing components of an app security program in accordance with one embodiment of the present invention.

FIG. 2 is a block diagram showing components of an app security program in accordance with one embodiment of the present invention. In one embodiment, the security program has two major components, a policy manager and a policy wrapper. A policy manager 202 accepts input from an administrator or other individual who is responsible for setting security for the mobile device. The person may be referred to as the governor since he is governing the security of the one or more mobile devices. The security policy may be set using various user interface screens. There are numerous examples of policies, including geo-fencing (e.g., the app can only be used in a building) and others. The service provider or the entity providing the app security program may also provide default policy and security settings which may be useful for home users. Examples of policy settings are described below. Policy input 204 is inputted into policy manager 202. Policy manager 202 takes the input/settings from the governor and creates policies or meta-data 206. The format or form of meta-data 206 can vary. They essentially reflect the policy settings from the governor.

Metadata (policies) 206 may be used as input to a policy wrapper 208. In one embodiment, this component of the program takes the policies and uses them to secure an app 210 by wrapping it. Wrapper 208 receives an app 210 from a handheld device 212. In one embodiment, wrapper 208 receives a copy of an app 210 instead of the original app 214 that was downloaded onto phone 212 (see FIG. 1B above). Here the handheld device 212 user attempts to download an unsecured app 216 from an app provider 218. In the scenario in described in FIG. 1A, it may operate on the app itself instead of a copy. This may be the case where a market place or app store offers customers a secured version of the app along with an unsecured version (or only offer the secured version). A secured version 220 (security-wrapped version) is returned from policy wrapper 208 to device 212.

Metadata 206 may also be used to update a local policy file (an existing policy that is already on the device). A local policy file is used to update policy parameters residing on device 212. For example, in the case of "geofencing" (i.e., restricting use of an app to an certain physical areas) it is likely that the GPS locations controlled by the governor will change over time. When such a change occurs, the new policies can be applied in two different ways. One is to generate a new policy and apply it to the original app (i.e., wrap the app with the new policy). Another way is to allow dynamic configuration based on a local policy data file with the "variable" part of the policy encrypted/signed inside it. For example, an IT person may want the ability to override a configuration on a device directly through an IT app residing on the device for diagnostic purposes.

In one embodiment policies have two components: a fixed part and a variable part. The fixed part is the content described in the policy file (e.g., "protect the GPS at certain times of day"). The variable part typically is provided by the governor through a console (e.g. "what are the times when the GPS should be protected?"). The variable part can change without applying a new policy.

Policy designers can choose to forego the variable component of the policy and basically "embed" all data or content statically in the policy file. In this case, the console does not have any way to customize the policy.

If the policy designer chooses to include some variable component in the policy, when changes are made to the variable data (on the console), a new data file could be sent to the device to reflect the latest changes. Such a file would be encrypted/signed (to prevent a malicious app circumventing the policy), downloaded to the device, and used by the app security code on the device to apply the new data to the appropriate policy.

Such changes and updates may be done by local policy update component 222 at runtime. This component creates updated policy parameters on device 212. Thereafter, wrapped app 220 will use the updated policy parameters.

In one embodiment, policy manager 202 and policy wrapper 208 are components in the same app security program and may operate on the same computer. In other embodiments, the manager and wrapper components may be on separate computers. For example, the policy manager 202 may be on a server at one site and the policy wrapper 208 may be on a computer at another site and may be managed by a different entity or the same entity. Collectively the manager and wrapper form the app security program which, in one embodiment, is operated by a security service provider. It may also be provided by an enterprise, such as a company, employer, business partner, and the like, or by a mobile phone carrier.

Figure 3:
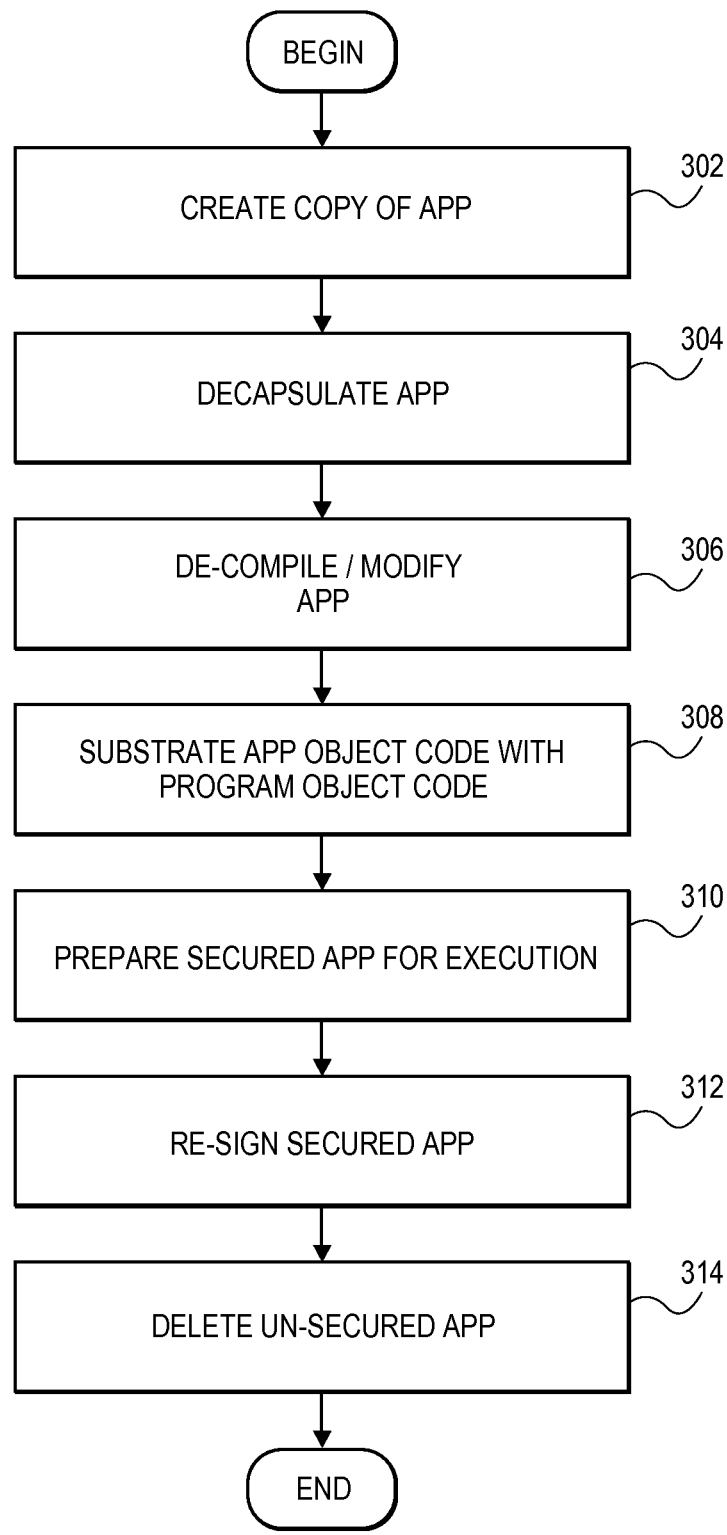
FIG. 3 is a flow diagram showing a process of making an app secure before downloading it on to a device in accordance with one embodiment of the present invention.

FIG. 3 is a flow diagram showing a process of making an app secure before downloading it on to a device in accordance with one embodiment of the present invention. At step 302 a copy or clone of the app that is to be secured is made on the device. In one embodiment, this may be done on the mobile device itself or may be done off the device, for example, on components on the Internet, in the cloud, on an enterprise's server or on a carrier server. The user may be an individual, an employee of a company or other entity. As is known in the field, an app may be obtained in a number of ways, most typically from an app store or an app market, or directly from the app developer or provider or in any suitable manner. By making a copy, the original app is preserved giving the user an option to use either the secured or unsecured version and also protects the user's ability to use the app if something goes wrong with the app control process. Note that in one embodiment, the app is not yet downloaded on to the phone. In one embodiment, the methods described below are performed on separate computing devices. In another embodiment, the process may be performed on a mobile device, but the app is only executed on the device after the process is complete and the app has been made secure.

At step 304 the app is decapsulated. Most, if not all, apps have digital signatures signed by the author/developer. At step 304, as part of the decapsulation, the digital signature is removed from the app. This may be done using techniques known in the art. Decrypting the app may also be performed at this step. These and other steps provide the core object code of the app which may now be operated on by the app control program. The nature and specifics of this operation may depend on the mobile device's operating system.

There are several examples of operating systems for smart phones such as iOS (for the iPhone), Android (used on handsets from various manufacturers), Windows Mobile 7, Web O/S, Palm, and others. At step 306, the core object code app may be either disassembled or decompiled to obtain the executable object code. For example, it can be either "native code" (CPU instructions) or bytecode (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been decapsulated may be done using techniques known in the art, such as using disassemblers.

At step 308 the app object code is augmented with object code from the app security program. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 310, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer. That is, the secured app may still be subject to the security provisions of the operating system. In one embodiment, certain cosmetic changes may also be made to the app, such as changing the icon for the app to reflect that it is secured. By doing this, the user can be sure that when the app icon appears on the handset screen that the secured version of the app will be executed. The app has now essentially been re-factored or re-programmed by the security program.

At step 312 the app is signed with a new key, for example, with the key of the service provider or the key of the enterprise providing the secured app. The re-factored, secured version of the app is returned to the handset device. In another embodiment, the app is wrapped with the security layer on the phone. At step 314, in one embodiment, the original, unsecured copy of the app is deleted from the handset device. This may be done by the secured version of the app once it is downloaded onto the handset. In other embodiments, this is not done and both versions remain on the mobile device. At this stage the process is complete.

Figure 4:
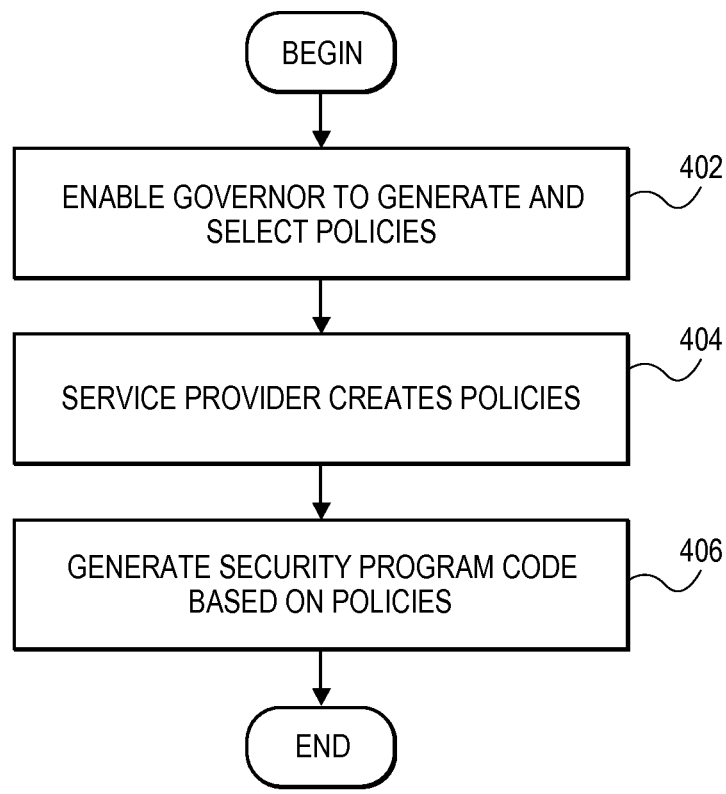
FIG. 4 is a flow diagram of a method performed in policy manager in accordance with one embodiment.

FIG. 4 is a flow diagram of a method performed in policy manager 202 in accordance with one embodiment. At step 402 the governor or other security policy individual is enabled to define, generate, and create security policies. This may be a network administrator for an enterprise deciding a vast array of mobile device security policies for hundreds of employees using dozens of enterprise apps (specifically for work) that may be downloaded on hundreds or thousands of mobile devices. On the other end of the spectrum, it may be a parent who is setting security policy for three or four apps downloaded by her child on a new mobile device. Other examples include preventing or squashing a gaming app using GPS, preventing an app from using a microphone on the device to record or eavesdrop on a conversation, among many others. In either case, the governor may take into consideration the category of the app, the type and nature of app, the author, the age-appropriateness, and numerous other factors. For example, has the same author written any other apps that may have been classified as malware or posed a security threat to the device. It may determine whether there are other apps by the same author. It is at this stage that the governor decides which rules to apply for each app. In one embodiment, this is done off-line by the governor. That is, it may be done using user interfaces on a home computer or on an enterprise network computer used by an administrator where security templates provided by the security program service provider (essentially default templates) may be used or very specific rules may be set using the templates.

At step 404 the security data input at step 402 is used by the app control security program to create the actual policies. At step 406 the app control security program object code is generated based on the input from the governor regarding security policies created at step 404. The governor or service provider may also update existing security policies if needed. As described above, the object code may be used to enhance certain original object code obtained from the disassembled app. The enhancement code is inserted to adjust security and privacy settings for an app in order to protect the enterprise and end user. The original app's behavior is altered which allows the governor to control how the app behaves. For example, if an app stores sensitive account information in the clear (i.e., un-encrypted), the behavior could be changed so that all information the app creates is stored in encrypted form and which can only be accessed by that app given that the key to the stored, persistent data would be unique to the app. In many instances the enhancement code can improve the apps performance since the code is optimized for a particular use scenario.

Figure 5:
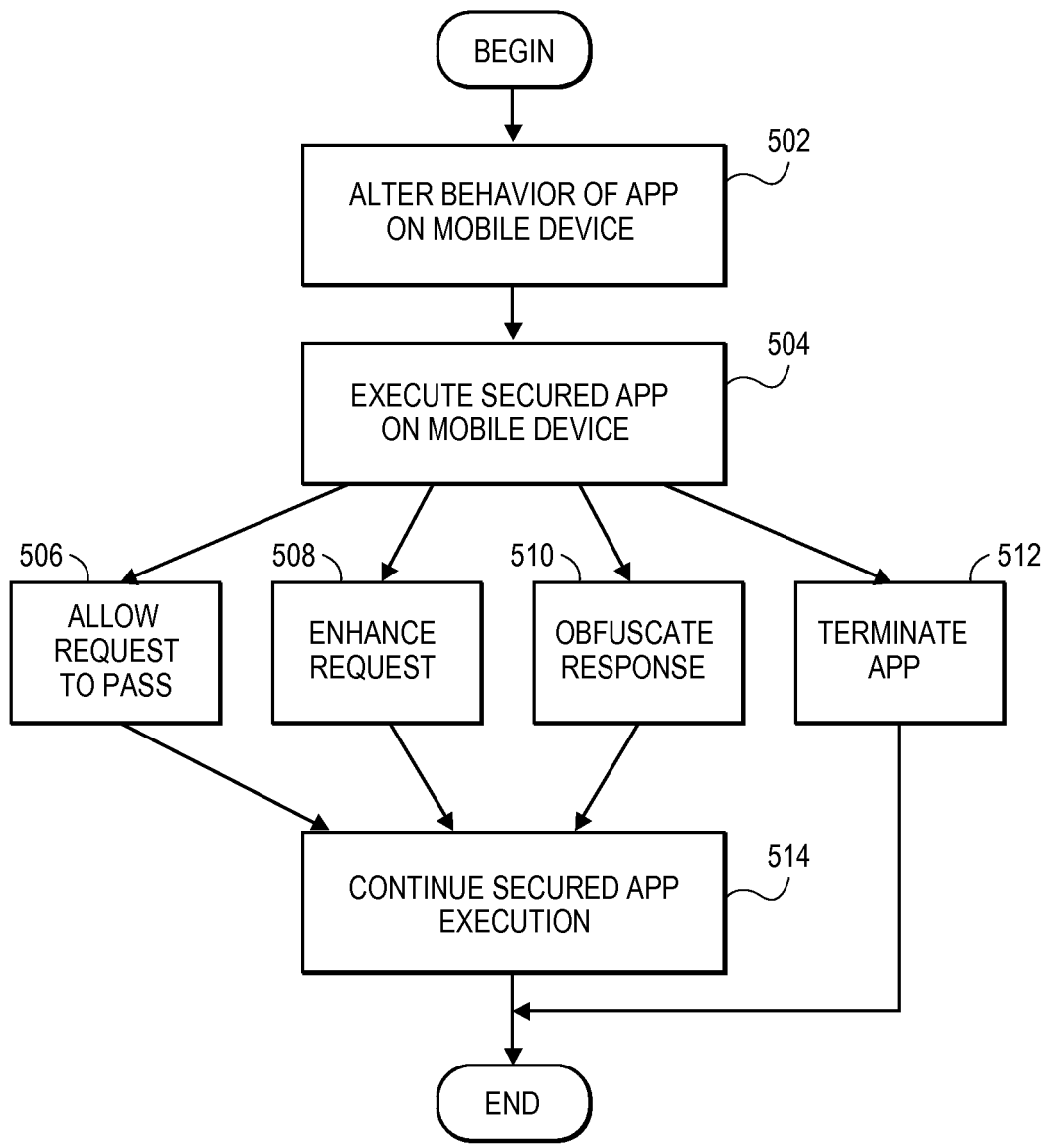
FIG. 5 is a flow diagram showing a process of a security-wrapped app executing on a handset or mobile device in accordance with one embodiment.

FIG. 5 is a flow diagram showing a process of a security-wrapped app executing on a handset or mobile device in accordance with one embodiment. At step 502 the behavior of the app when the app executes or immediately before it executes on the device is altered or modified. For example, behavior modification may include authentication during app initialization; e.g. smart/CAC card, or password challenge. Some apps, as originally designed, may not require a password for security, however, a secured version of an app which has been modified may require that the user enter a password. At step 504 the secured app executes on the mobile device by the user activating it (e.g., tapping on the icon if the device has a touch screen). Upon execution of the app, in one embodiment, control can take one of four options. As is known in the art, when an app executes, it makes calls or requests to the device operating system in order to carry out its functions. In many cases these calls may be harmless or pose no significant security threat to the phone or device. If this is the case, the call may be allowed to pass to the operating system as shown in step 506. Here the call is made to the device operating system and the app executes in a normal manner.

If the security layer or wrapper around the app detects that the app is making a request that may pose a security threat to the device, the app security layer may enhance or modify the request before it is passed to the operating system or other software or hardware component in the phone. This is shown at step 508. In one embodiment, the governor determines which calls are permissible by examining the one or more policies. For example, the governor may determine that all data should be saved in encrypted form. In another example, the governor may decide that only a select group of trusted apps should have data on a soldier's GPS coordinate. In one embodiment, there is no runtime logic to determine what is safe, a potential threat, or an actual threat; it is essentially pre-declared by the governor in the policy created at step 404 above. In another embodiment, there may be some runtime logic. For example, an app may be trying to send out expensive SMS text messages. The app control program may determine this and block the app from sending more than a certain number of text messages, for example, it may limit it to transmission of one message. The enhancement may be adding something new, such as a password requirement. In another example, if the call is to save data on the mobile device memory, the secured app may actually back up the data to a storage area in the cloud or on the Internet (i.e., off the device). In another example, the data related to the call may be encrypted.

At step 510 the secured app may determine that the call is an actual threat and should be dealt with in a more severe manner than at step 508. For example, it may have decided that based on the policy for an app, that if a camera on the device is accessed while in a secure building (e.g., the Pentagon), the app should immediately be terminated. Merely enhancing the request may not be sufficient in this case. At step 510, the request may not be allowed to proceed to the operating system or any other component of the device. However, in one embodiment, a response is returned to the app, but that response is intentionally not accurate or correct. It is essentially an obfuscated response. For example, it may be a GPS coordinate that is not the actual physical coordinate of the device (e.g., the device is in California, but the GPS coordinate that is returned to the app is a coordinate in Nebraska). This may be desirable when apps are used by children. Other examples may be returning bad or garbled data results if an app that should only run within a restrictive environment (e.g., a secure office area) is determined to be running outside that environment (e.g., at home). In this example, the app may be partially crippled so that the app can only access unclassified data and wherein classified information is nullified. In another example, when a user is attempting to paste or copy sensitive data from a classified app to a non-classified app, the app control program may change the copy of the data that is being pasted to garbage or essentially make it meaningless. After either steps 506, 508, or 510 have completed, the security-wrapped app continues execution on the mobile device at step 514.

At step 512 the security layer around the app has determined that the call being made by the app or that the app execution behavior in general poses too high a security threat level to the mobile device. In this extreme case, the security layer decides to terminate execution of the app and/or delete the app. For example, the app may be using too many resources on the phone, such as bandwidth, or is making too many high-risk calls to the operating system thereby over-exposing the mobile device. In this case, the app can simply be deleted from the phone or the app may be terminated. The user may not be able to re-execute it or re-install it. For example, an employee may not install that app again on the company phone because it was exposing sensitive company data. Or it may be determined that an app is secretly collecting data on the phone or installing malware.

Figure 6:
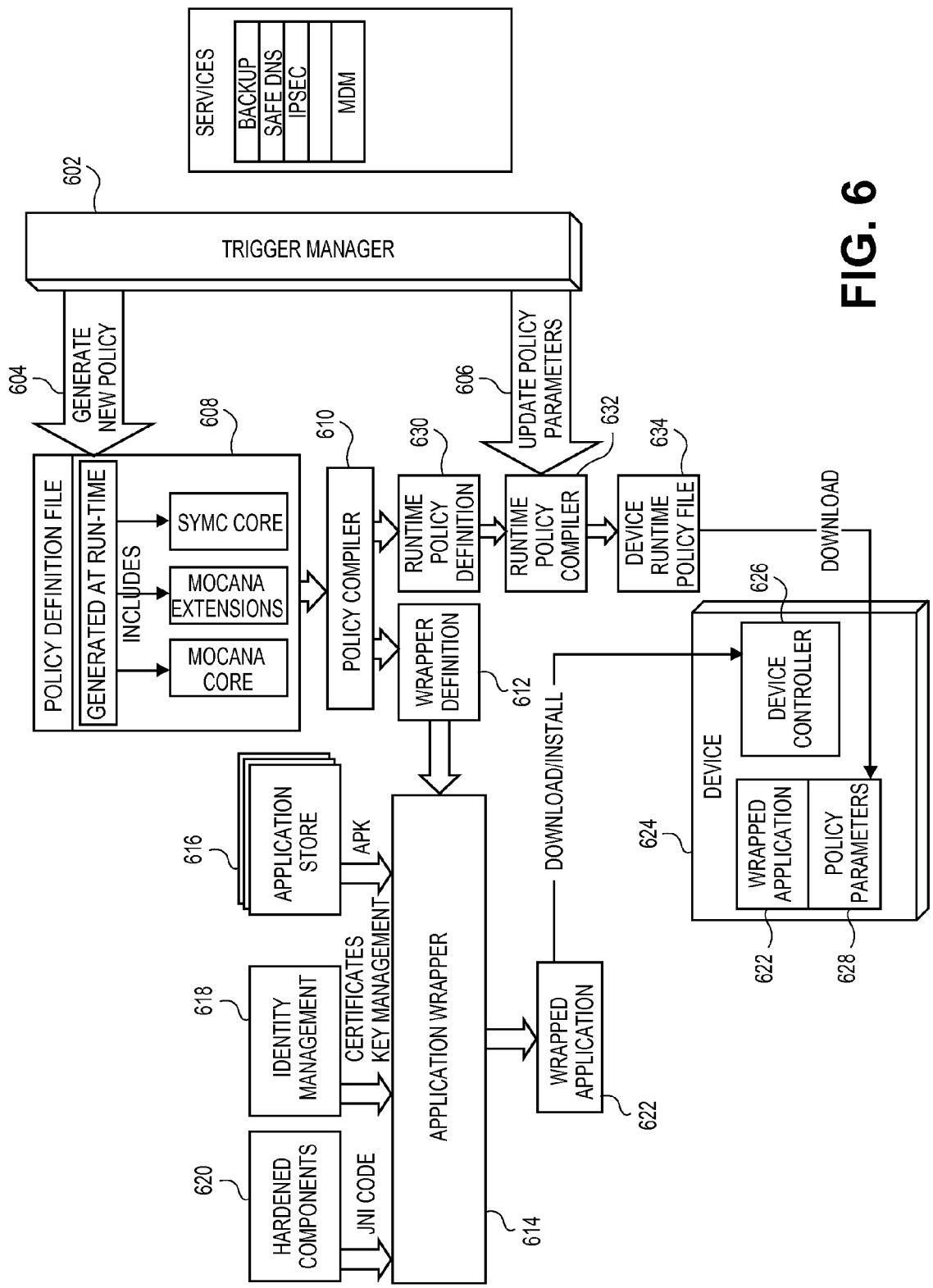
FIG. 6 is a system architecture diagram of the app security control system in accordance with one embodiment.

FIG. 6 is a system architecture diagram of the app security control system in accordance with one embodiment. A trigger manager component 602 handles two events, one for generating a new policy 604 and another for updating policy parameters 606. Such events can be triggered by various systems. For example, a console administrator or governor might apply a new policy to all devices (a manual operation). Or a network monitoring application, after detecting suspicious traffic originating from a device (or app), could push a new policy that would prevent a user/device/app from accessing network resources (an example of an automated operation). The various systems or entities that have the authority to change/update polices, do so through the trigger manager 602.

New policy output 604 is input to a policy definition file 608 which may be generated at runtime and may include various types of code and extensions, for example, specific to the app control service provider, or to the app/user/device the policy applies to. Policy definition file 608 is input to a policy compiler 610 which has two outputs. One output is a wrapper definition file 612. This file is input to an app wrapper component 614. App wrapper component 614 is responsible for generating secure app by injecting custom binary code (native or bytecode) into an app, downloaded directly, for example, from an app store. Or the app could be an app the user downloaded on to his device, and then uploaded to an "App-Control" server.

App wrapper component 614 may have three inputs: apps from one or more app stores 616, certificate key management data from identity management component 618, and hardened components 620. Key management data is used to tie the identities of the user, device, and the app, and ensure that any operation subject to policy control can be tied to a specific user/device/app. This also ensures that a wrapped application can only be run on a specific device to prevent a malicious app from circumventing policies and hardened components 620 (for example "Device security framework"). The output from app wrapper 614 is a wrapped app 622 which is downloaded or installed onto mobile device 624 via the device's controller 626. Device controller 626 responsibilities include: download app from the app wrapper; ensure that app running on the devices are appropriately wrapped apps (e.g., app wrapped for user1 should not be installed/run on device for user2); report list/version of installed applications to allow the management console to control policies for each device/user/application; and download policy parameters when appropriate. Wrapped app 622 resides on device 624 coupled with policy parameters 628.

Returning now to policy compiler 610, the other output is a runtime policy definition file 630. This file is input to a runtime policy compiler 632 which also accepts as input policy parameters 606 (specified by the management console, or other subsystems). Output from compiler 632 is a device runtime policy file 634. This file 634 is downloaded onto device 624 as shown as policy parameters 628, and is used to customize the policies applied to wrapped app 622.

Described below are various use cases and capabilities of the app control security program of the present invention. One use case involves the separation of work life and personal life on a mobile phone. There are apps for the user's personal use and apps that the user's employer (or a business partner of the employer) may have provided and the apps operate on the same phone, which is often the user's personal phone. The governor who determines security of the apps that need to be secured on the user's phone may block copy/paste operations between apps (such as e-mail apps). The governor may set policies for the work-related apps that perform selective wipes of apps and associated files. User location-based policies may also control where certain apps may execute. Examples of levels of protection because of malware are denying access to contacts, denying transmission of SMS without consent, and the like.

Another example of a use case is app control. Using the present invention, white and black listing of apps may be implemented, as well as full deletion of apps according to the policies set by a governor. An app may be 'sandboxed' to protect the other apps, software, and hardware of the device.

Other capabilities may include identity-based control of apps or services and highly granular control over app behavior. Trojan identification is another use case that can be implemented with the app security program. For example, each app and content may be encrypted to prevent rogue apps from gaining access to and stealing confidential data on the phone. The security program may also be able to identify anomalous system call behavior of an app to identify malicious Trojan apps that act outside of their published intent.

Another use case is back-up and recovery of app data in which IT security administrators and governors have data revision control and can implement app and device content migration through back-up and restore operations. In another use case is network traffic monitoring. The app on the mobile device may be brought under the visibility of existing enterprise IDS/IPS/Web filtering infrastructure to allow for inspection and control of app communications. The app security program can also integrate with third-party DNS services, such as Symantec's DNS service to identify malware. All app communications may be encrypted, including communications at the mobile phone service provider. Other use cases include session continuity, consumer privacy (e.g., GPS obfuscation, implementing safe DNSs), and intercepting payment/transaction messages from the mobile device (i.e., operating in the middle of mobile commerce streams).

In one embodiment, the app security service is offered by a third-party service provider, for example, to make apps used by end-users or individuals (i.e., users not associated with an employer or enterprise). For example, a parent may want to obfuscate the GPS of a child's phone because the parent does not want a social network site, such as Facebook, to know where the child is, essentially disabling GPS. In another embodiment, an app store, operated by a wireless phone carrier (e.g., Verizon, AT&T) may offer a secured app for an extra charge or premium. A customer of the carrier can download the secured app from the marketplace or online store instead of the unsecured version by paying an extra amount. In another embodiment, an enterprise may have its own app store for its employees, partners, and the like, where users can only download secured versions of the apps (which may be referred to as "hard" apps). These apps may have many of the security features described above as defined by a governor (security administrator) at the enterprise, such as blocking copying and pasting e-mail or corporate data, killing an app from the user's phone if the user leaves the company, and so on. A mobile phone carrier's DNS can typically access any site, but the app security program can block a mobile device browser so that it can access only a safe DNS (e.g., Symantec's DNS) from where only safe Web sites may be accessed. In another embodiment, the app security program provider can work with the mobile device manufacturer to incorporate the app security program or functionality into the hardware and software operations of the device. In this embodiment, described below, a user can download an unsecured app and make is secured on the phone or device itself before executing and does not have to access a third-party service to have the app secured or ensure that the app is secured before being downloaded onto the device.

As can be seen from various embodiments described above, the security of the mobile device extends beyond the device itself and is applied directly to the apps that are downloaded onto the device. Companies and other entities are able to take advantage of apps more freely without having to worry about the security risks, such as data leakage or malware infection of the company's enterprise IT system. Companies can maintain governance of its corporate data.

In another aspect of the present invention, a VPN is created and utilized by individual apps on a device. That is, an app has a VPN tunnel to communicate with, for example, a corporate VPN gateway. This VPN tunnel is used only between the single app on the device and the VPN gateway. In one embodiment, each security wrapped app has its own IP stack or, more generally, VPN stack. Methods and systems for creating a VPN tunnel for a specific wrapped app on a device are described in FIGS. 7 and 8.

As noted above, conventionally, a VPN tunnel is built (on the client/device side) on top of the system UDP or TCP modules, which in turn communicate with the VPN gateway. In the described embodiment, the device may be a smartphone, tablet, or other mobile device. In other embodiments, the device may be a PC or a laptop. It may also be a wearable device, such as a watch, goggles, or other nomadic Internet-enabled computing device. In yet other embodiments, the device may be any Internet-enabled appliance or system. Examples include cars that have Internet access, household appliances (refrigerators, washers, etc.), or HVAC, home heating/AC systems, or security systems. As noted, the described embodiment uses mobile devices where users download apps. However, the present invention may also be used in other embodiments and contexts.

Generally, there is software on the device, such as a smartphone, tablet, PC, or other Internet-enabled device, that allows it to make a VPN connection to a gateway device. However, the described embodiment provides a more compartmentalized way of creating and utilizing a VPN tunnel on the device that is more secure. In one embodiment, each wrapped app has its own VPN tunnel. In another embodiment, some or all apps in a federation of apps on a device have the option of sharing one VPN tunnel. A secure form of IPC may be used to communicate between the processes in the case of a "federated" application. As described in more detail below, IPSec packets may be built for each wrapped app (each wrapped app operating in its own sandbox, that is, outside the device operating system). The IP packets are transmitted via a proxy or virtual data link layer (part of the app VPN stack) to a native UDP module in the operating system. From there it is transmitted to a VPN gateway. As noted above, the device may also be a PC. For example, a PC running a wrapped version of Microsoft Outlook may have its own VPN tunnel from the PC to the gateway In order to establish a VPN tunnel, an initial step is to create only packet types that a typical operating system makes available to applications. For example, to connect to an IP-based VPN, an application can use TCP or UDP packets. In the described embodiment, the app IP stack uses UDP packets. Generally, it should not use "raw" IP packets (without a specific Layer 4 protocol), because such packets are typically reserved by operating systems so that only privileged applications may send or receive them. A per-app VPN, as described in various embodiments of the present invention, is not required to be a privileged process on the device. NAT traversal of IPsec packets is enabled using UDP protocol (as described in RFC 3947 and RFC 3984), rather than raw IP packets.

In order for an app to send data through a VPN tunnel to a gateway, the app must be able to build IP packets which are then encapsulated using VPN software on the device. The IP packets are built using an IP stack. This software typically resides in the operating system of the device. Therefore, in order for a per-app VPN to operate, in one embodiment, the app makes use of an IP or VPN stack that is used to build a tunnel that is only used between the single application and the gateway. That is, in one embodiment, it is not used by other apps. This stack may also be referred to as a per-app IP stack, in the app sandbox. The goal being to generally replicate operating system functionality in the sandbox.

Figure 7:
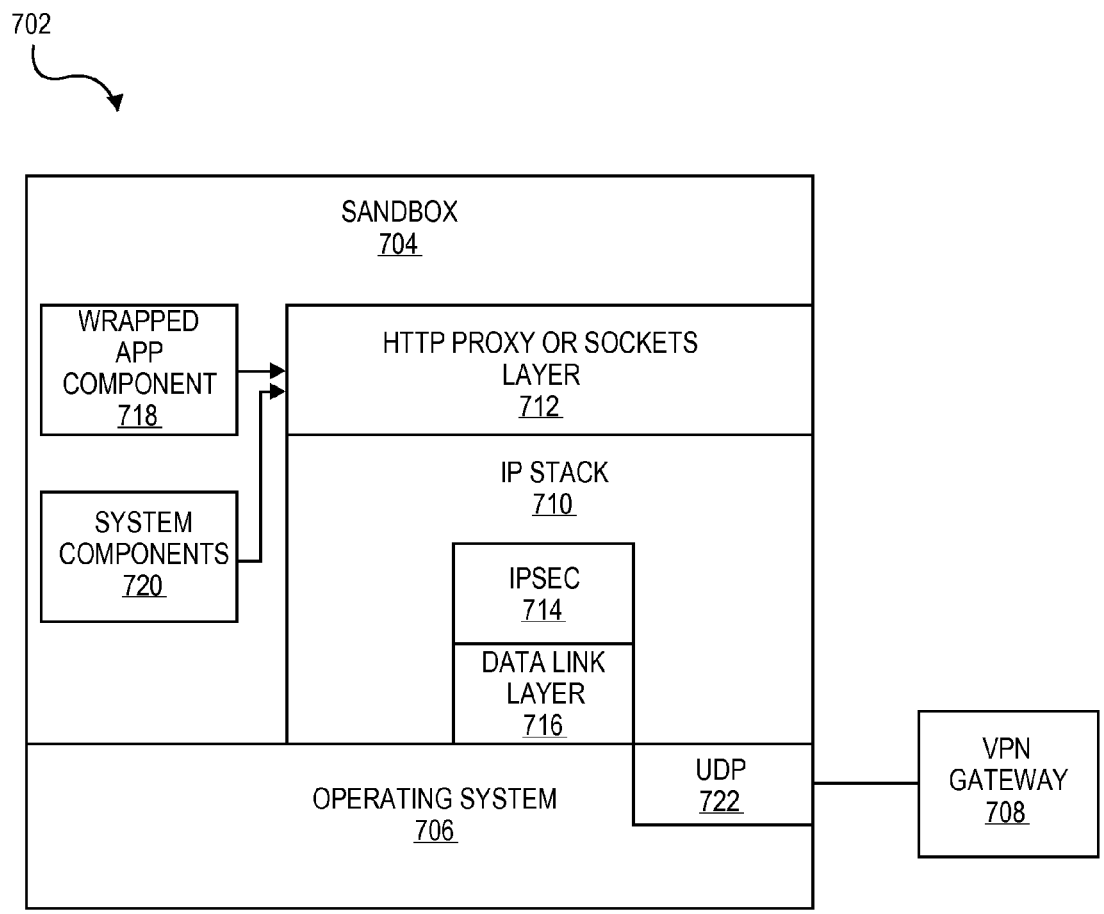
FIG. 7 is a block diagram showing components and modules in a mobile device needed for implementing a per-app VPN in accordance with one embodiment.

In order for any IP stack to access an outside network, it uses software referred to as data link interface (also known as Layer 2, per the TCP/IP and OSI networking models). In one embodiment of the present invention, and as shown in FIG. 7, this data link interface is implemented as a proxy (or virtual) data link interface to an underlying operating system's (native) IP stack. In one embodiment, given that only UDP packets are sent and received, this proxy data link interface supports sending and receiving UDP traffic via the native operating system's IP/VPN stack and the per-app IP/VPN stack. An IPsec module decrypts the inbound traffic coming from the virtual data-link layer, and encrypts the outbound traffic from the per-app IP stack.

IPsec is typically implemented as a "bump in the [IP] stack", and is integrated into an operating system's IP stack. In one embodiment, IPsec is implemented in the per-app IP stack instead. As noted, a proxy or virtual data link interface for IPsec is defined in the per-app IP stack. The IPsec encapsulates traffic (IP packets) built through the per-app IP stack and routes the traffic via the proxy data link interface, in one embodiment, to a UDP module in the native operating system space.

FIG. 7 is a block diagram showing components and modules in a mobile device needed for implementing a per-app VPN in accordance with one embodiment. Shown are the two relevant memory spaces on a mobile device 702: a sandbox area 704 containing components of a wrapped app, system components, and an IP/VPN stack, and a device operating system space 706. Also shown, external to mobile device 702, is a VPN gateway component 708. As noted above, embodiments of the present invention involve creating and implementing an IP stack for a security wrapped app in sandbox area 704.

An IP stack 710 has some of the conventional layers of a TCP/IP stack, such as network layer and transport layer. Above IP stack 710 is an HTTP proxy or sockets layer 712. Two components in app IP stack 710 are IPsec 714 and proxy data link layer 716. Virtual data link layer 716 functions as an IP interface to between virtual IPsec 714 and native UDP module 722. The combination of virtual IPsec 714, virtual data link layer 716, and IP stack 710 may also be referred to as a "per-app VPN" stack. The primary goal of the per-app VPN stack of the present invention is to replicate operations and functionality that take place in native operating system 706. Components for a single app and any system components reside in sandbox area 704. However, for illustration, only one app component 718 and one system component 720 are shown.

Native operating system 706 contains several components, including a system-level or native IP stack (not shown). One of the modules in operating system space 706 needed for the present invention is a UDP module 722. As noted, IPsec packets are transmitted from mobile device 702 to VPN gateway 708 using UDP. In other embodiments, TCP may be used. Data packets for the security wrapped app are also received from VPN gateway device 708 at UDP module 722 and relayed to proxy data link layer 716.

Figure 8:
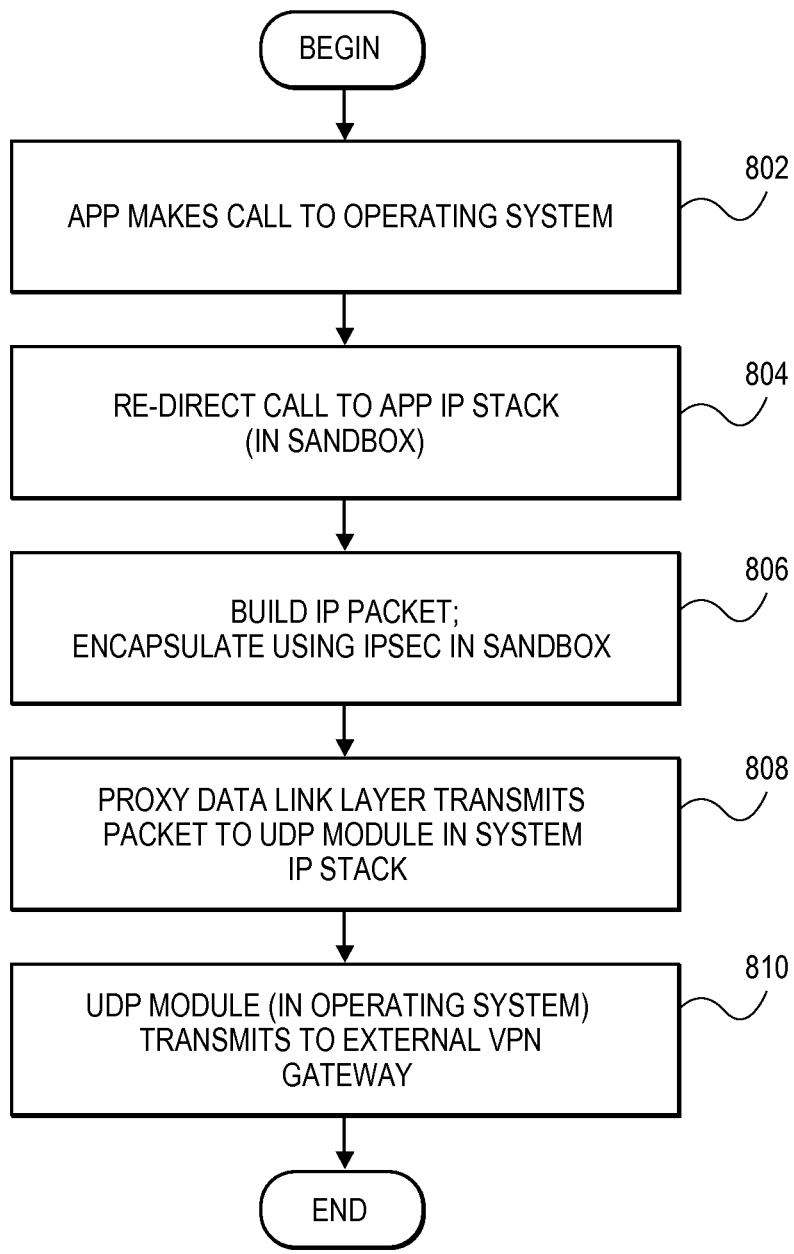
FIG. 8 is a flow diagram of a process of implementing an app VPN in accordance with one embodiment of the present invention.

FIG. 8 is a flow diagram of a process of implementing an app VPN in accordance with one embodiment of the present invention. A security-wrapped app in sandbox 704 executes in a normal manner and in the process makes calls to the device operating system, some of which require communication over a VPN. This occurs at step 802. In one embodiment, those calls are re-directed to app IP stack 710 at step 804. In one embodiment, The interfaces that are exposed to the application (and app and system components, boxes 718 and 720) through HTTP proxy layer box 712 mirror the corresponding interfaces provided by operating system 706.

At step 806 the app IP stack builds IPsec packets in a conventional manner. This would normally be done by the system/native IP stack as a result of an app or system component in the sandbox making a call to the operating system. IP packets are then encapsulated using IPsec in the app VPN stack. At step 808 a proxy data link layer, also part of the app VPN stack, transmits packets to a UDP module in the system/native IP stack. In other embodiments, where an SSL VPN is implemented, the packets may be transmitted to a TCP module. As noted, the proxy (virtual) data link layer functions as an interface between the app IP stack and the system native stack, specifically the UDP module. The IPsec module can be described as a virtual IPsec interface. This interface together with the virtual data link interface functions to get IP packets down through the app VPN stack and out through the native UDP module to the VPN gateway.

It may be noted that this is possible by virtue of using network address translation (NAT). As is known in the art, this technique allows an entity to allocate "private" IP addresses which are mapped to public IP addresses. The private IP addresses are never seen by the public. Traditional NAT approaches are able to rewrite an IP packet and then send it to a different, private address.

As noted above, by configuring a particular application with its own VPN tunnel, one could configure the app security wrapping server to restrict access to network resources so that the app can only access the specific resources it needs. If HTTP proxy 712 is listening on a TCP port provided by operating system 706, other applications could potentially connect to that TCP port. In one embodiment, HTTP proxy layer 712 implements techniques to prevent other applications on the device from accessing the HTTP proxy. In one embodiment, the system determines if a connection to the HTTP proxy layer 712 came from the current process (i.e., the wrapped, host app), for example by looking through all the file descriptors in the current process and checking with the kernel to determine if any of file descriptors made the connection to HTTP proxy layer 712. If the authenticity of a group or federation of apps can be validated and establish communication between those apps, in one embodiment, the federated apps can share a single VPN tunnel. Although this would lower the number of concurrent VPN tunnels needed for a device, it may detract from some of the advantages described above, such as configuring a server to restrict access to network resources such that the app can only access the specific resources it needs.

As such, in one embodiment, only the specific security wrapped app can connect to the VPN tunnel that is created by that app's VPN stack. This prevents another malicious app or any other malware on the device from stating that the HTTP proxy for another app is also the proxy for the malicious app, thereby preventing the malicious app from using the wrapped app's VPN. In another embodiment, a VPN tunnel created by a security wrapped app may be shared by other wrapped apps in the same federation or group as the app that created the VPN.

In another embodiment, a device user may need a VPN to gain any type of access or connectivity at all (e.g., if the user is working abroad in a country with restrictive Internet access), the user can access a device-level VPN to gain initial full-internet access, and then use a per-app VPN to gain corporate access.

Another advantage of tying a single application to a VPN tunnel is the ability to restrict, at the VPN gateway, the network resources that the application has access to, by using a different "configuration profile" (i.e., VPN group) per application.

Now, in another aspect of the present invention, network security is enhanced from the perspective of the gateway owner (the gateway was first described in FIG. 7 showing a VPN between an app on a device and gateway 708). That is, security of components behind the gateway, such as a corporate or institutional network, is better protected. As described below, in one embodiment, security is enhanced by virtue of the ability to report a jail broken or rooted device. The reporting may be done via the private tunnel to the gateway which, in turn, can report to the appropriate network components. In yet another aspect of the present invention, the gateway is able to scale in order to manage a large number (e.g., tens or hundreds of thousands) of private tunnels, such as VPN or IPSEC connections, with apps on mobile devices.

As described, an app security provider, such as Mocana Corporation of San Francisco, Calif., supplies the software needed to wrap the app according to selected and default policies on the device. The app security provider can also provide software that enables the wrapped app on the device to create a private tunnel, such as a VPN or IPSEC connection, between the app and the gateway which may be under control of, for example, a company, such as the user's employer. The app security provider may also provide the software and hardware comprising the gateway to the company. In one typical scenario, the user of the device is an employee of a company. The device is in many cases owned by the user (it may also be owned by the company and given to the user for work use). The device runs one or more apps that are provided by the company to the employee/user or are in some way related to the employee's work for the employer, for example, an e-mail client. The apps are wrapped by the employer (for example, by the IT department) using the security wrapping software purchased from the app security provider. Once wrapped they are given to the user before the apps are used by the employee (herein referred to as "user").

In one embodiment, each user has one device (or more) which may have multiple work-related, security-wrapped apps. The employer may have hundreds or thousands of users, each using their own device having one or more wrapped, work-related apps. Each of those apps, when running, will have its own dedicated private tunnel with the employer's gateway (gateway 708 above) which, in a conventional setting, means that the employer will potentially have to manage a very large number of unique IP addresses. These unique IP addresses will likely be 10 net addresses. The IP addressing issues and having to route traffic back to the apps from the gateway will almost certainly be, for the employer, an insurmountable or, at the least, a significant technical and logistical challenge.

It would be desirable to provide means and methods for reducing the number of unique IP addresses that an entity, such as an enterprise, would have to assign and manage, while concurrently being able to scale up the number of wrapped apps and their private connections with a gateway. That is, keep the advantages of a per-app VPN embodiment but reduce the administrative and technical drawbacks and impediments of implementing these embodiments.

With the increase in the number of user devices that can connect to the gateway, it would also be desirable to be able to inform the gateway of jail broken and rooted devices in order to maintain security of the internal enterprise network.

As noted, an issue that will concern enterprises using the gateway is potential breach of security of the enterprise network (behind the gateway) from jail broken or rooted devices. As noted, the mobile devices will, in most cases, belong to the employees (reflecting the increasingly common "bring your own device" BYOD environment) and the employer will want to prevent or be warned if users use jail broken or rooted devices. Or it will at least want to know when such a device is being used to connect to the gateway. For a large employer with thousands of users and, consequently, thousands of different devices connecting to its gateway, there will likely be a non-trivial number of devices that are in fact jail broken or rooted. The employer will want to know when such devices connect to the gateway.

As such, it would be desirable to enable a wrapped app to report to the gateway, via the app's private tunnel, whether it is running on a jail broken device. It is helpful to note here that the app security software running on the device that wraps the app performs the actual detection of whether the device is jail broken. This jail break detection is a separate operation from the function relevant to the present invention, namely, reporting whether the device is jail broken to the gateway (i.e., to the employer or enterprise).

Before describing two phases of establishing a connection between an app on the mobile device and the gateway, it is helpful to provide a brief overview of the capabilities of the gateway working with a wrapped app on a mobile device which, from the perspective of the gateway, may be characterized as a trust point. As described below, the functionality and capabilities of the present invention stem from the enterprise owning both the gateway and the wrapped app, both of which utilize app security software. As noted, the security provider provides software for wrapping the app and software for the gateway (and may also provide the gateway itself.

At the center of the gateway's capabilities is the ability to terminate a large number of private connections. These connections may use VPN/SSL, IKE/IPSEC or other protocols or standards. In the described embodiment and for illustrative purposes, the gateway terminates IKE/IPSEC sessions that originate from wrapped apps. Another central capability of the gateway is the ability to enforce a higher level of authentication or security between a wrapped app and the gateway. As noted, one feature of this is the ability of a wrapped app to report a jail broken or rooted device. Another capability of the gateway is getting detailed traffic data related to data packets coming from and going to wrapped apps. The gateway has other capabilities, some of which use an app-specific database.

A process of establishing a secure tunnel or connection to prevent eavesdropping or tampering between apps on the mobile device and the gateway can be described in two phases. In one embodiment, Phase 1 may be characterized as an extension of the XAUTH protocol with two-factor authentication. Each wrapped app (also referred to as "client" below) goes through IKE/Phase 1 with the gateway (also referred to as "head-end" below). When an app is wrapped, it is provided or pre-configured with a public, unique IP address and/or fully qualified domain name for the gateway. That is, the app is given the ability to "call home." The app first needs to prove its identity to the gateway. This process starts when the app is invoked by a user on a device and attempts to make a secure, private connection with a gateway. A user can also provide a re-connect token that is unique to the user's application and device.

As is known in the art, this is the first factor of the two-factor authentication process. The client uses a secure tunnel to transmit a device certificate to the gateway using the gateway's public IP address. The gateway examines and verifies the certificate using conventional means. If the enrollment certificate is valid and the head end is satisfied as to the user's identity, the process for the second factor begins.

With respect to the second factor of the two-factor authentication process of the XAUTH extension, the client negotiates security associations for data transmitted between the client and head end (i.e., the VPN gateway). The client proceeds with the XAUTH challenge where it proves its user name, password, MAC address, and protocol. The app also reports whether the mobile device that the client is running on is jail broken and other information, such as the name of the app running on the client. This is all done via a secure IKE tunnel. The client does this using an extension to the XAUTH protocol which can be characterized as a policy enforcement and reporting protocol, referred to as PERP. The gateway can validate this data locally by checking a database or it can use an external component, such as an AAA server or Active Directory.

Once the gateway validates this data and that the PERP reply is acceptable, the second factor of the XAUTH phase is complete. By virtue of this PERP-extended XAUTH Phase 1 stage, the wrapped app is able to report jail broken devices to the gateway which, in turn, can notify components in the employer's network (e.g., a security administrator's console). In other words, the gateway uses PERP to learn specific information about the app, the user, the device, IP address, and MAC address. Therefore, for any data received by the gateway over any of the IKE/IPSEC sessions, by virtue of PERP, the employer can learn, with certainty, which user sent the data, from which wrapped app, and from which device. It should be noted here that PERP can be used between two points over any secure protocol; it is not tied to IKE as in the described embodiment. PERP can be transported through any suitable secure protocol, including VPN/SSL. The enterprise can obtain this highly granular data without having to rely on heuristics, packet analysis, or other means, which typically result in estimates or less-than-certain results (i.e., intelligent guesses as to who, what, and where). In one embodiment, this is possible because the head-end (gateway) has a relationship with a trusted client from where the data originates. Additional details on PERP and how it can be used for seamless user authentication for an existing wrapped app, are provided below.

Once security associations are negotiated, the client initiates configuration with the gateway. In one embodiment, this is done using IKE MODE-CONFIG. At this stage, the app requests the gateway for a unique (internal) IP address. The app may also request a subnet and DNS name.

With respect to XAUTH/PERP in one embodiment, the gateway may query the client/app whether it is in a federation of wrapped apps on the device. That is, is the app one in a group of apps, referred to as a federation of apps, from the enterprise? If the client responds that it is, the gateway responds by transmitting a federation cookie to the client. In another embodiment, the gateway does not query the wrapped app regarding federation. Instead, it simply sends the app a federation cookie. If the app is not part of a federation, that is, it is the only app from the enterprise on the device (i.e., is a federation of one), the cookie subsequently may or may not be used. As described in the steps below, other apps in the federation will use this federation cookie.

Once the wrapped app has configured itself with the gateway, IKE Phase 1 is complete and a secure tunnel between the app and the gateway has been established. This policy enforcement would most likely be implemented during Phase 1 using PERP and later by monitoring traffic within the IPSec session. The gateway is now able to enforce policy (e.g., geo-fencing, copy/paste, etc.) on behalf of the employer/enterprise on users' devices. For example, the gateway can enforce a policy for a specific employee who is using a particular wrapped app and dictate that the employee only uses the app during certain times of the day and only in a certain geographic area (e.g., while on the employee's premises). The gateway can do this because it has accurate and specific data relating to the user, app, and device and can apply the one or more policies accordingly. As described below, the gateway may have a database containing app and other data that are used for policy enforcement.

The gateway is pre-configured to a specific mode, for example, IKE main mode or aggressive mode, XAUTH enabled or not enabled, and so on. As noted above, a wrapped app starts up and given that it is pre-configured with a public and unique IP address and domain name of the gateway, it is able to connect with the gateway. In main mode session, there is a six-packet exchange at the end of which the gateway and the wrapped app essentially trust each other. This is the end of 1-factor authentication after which the XAUTH/PERP exchange takes place, as described below.

During Phase 2, new security associations are negotiated via the Phase 1 tunnel and two new unidirectional Phase 2 tunnels are created between the app and the gateway; one for transmit and one for receive. As is known in the field of IPSEC, the gateway and the wrapped app create symmetric keys used by each for transmitting data through a new tunnel. At this point, Phase 2 is used for transmission of actual app data between the app and the gateway. Up to the end of Phase 2, the described embodiment utilizes: 1) the protocol for policy enforcement referred to herein as PERP, and 2) sending a federation cookie to the app for reasons described below.

As noted above, in IPSEC Tunnel Mode, the gateway gives a unique and private IP address to the wrapped app on the device. Often, a device will have more than one wrapped app and because each app goes through configuration mode, each will get a unique and private IP address. Essentially, each wrapped app registers with the gateway (one app begins by sending a message: "I'm app 1 on device A. I need a private IP address; another app on the device sends a message: I'm app 2 on device A, I need a private IP address . . . ," and so on.). There may be three, four or more such wrapped apps, each one having to go through Phase 1 with the gateway because each is an independently operating app even though they are in the same federation. Although they may be in the same federation, effectively, they do not know about each other, other than that they are in the same federation.

As mentioned, it would be a challenging technical and logistical task for an enterprise or any entity to manage a large volume of external, unique IP addresses (e.g., "10-net" addresses). Generally, it would not be feasible to issue a unique IP address for each wrapped app on each device. At the same time, it is desirable from a security standpoint to implement a private VPN or tunnel between each wrapped app and the gateway, as described with respect to FIGS. 7 and 8. The gateway hardware and software can scale to terminate a large number of IKE/IPSEC sessions. In another embodiment, it can terminate a large volume of SSL/VPN connections. Therefore, there is a need to consolidate IP addresses.

In one embodiment, this consolidation involves bundling or consolidating IP addresses for apps in one federation on one device. For example, if there are eight wrapped apps in one federation on a user's mobile device, instead of the VPN gateway having to assign eight unique IP addresses for that device such that each client (app) has a private VPN to the gateway, the gateway can assign one unique IP address for all the wrapped apps in one federation on the device. In one embodiment, the wrapped apps are in one federation. An employee of an enterprise will likely keep all the enterprise apps that the employee uses for work, all of which will be wrapped, in one federation.

As a result of this consolidation of IP address, in the described embodiment, the gateway has methods of determining which federated wrapped app on the device should receive return traffic, wherein that traffic could be for any one of the wrapped federated apps, when that traffic is received by the device. That is, which app should be designated to receive all incoming traffic for any app in that federation and route the traffic to the appropriate federated app once in the federation. The single IP address is sufficient to determine the mobile device and app federation but not the specific mobile app since each mobile application in the federation has its own set of Phase 2 security associations with the gateway; it is the port range, used in conjunction with the IP address, which allows the gateway to select the correct out-going security association for a particular mobile app in a federation. The IP address is for a specific federation of apps and thus the traffic will at least reach the correct federation. It is important to note here that the private connection and the traffic between the wrapped apps and the gateway still utilize correct Phase 2 security associations; this is accomplished with IP address together with the port range. Thus, the data traffic is still encrypted using the symmetrical keys established between a particular wrapped app and the gateway as described above.

For purposes of illustrating methods of consolidating IP addresses and thereby enabling termination of a large number of VPN tunnels at the gateway, it is assumed that there is a federation of n wrapped apps on a device, all of them related to the user's employer (or other related entity/enterprise), so that the app federation is tied to a gateway under control of the employer. There may only be one wrapped, work-related app on a device in which case the methods described here may not be needed. In this case all that is needed is the unique IP address that the app would have anyway. However, in another embodiment, the single app may be treated as an app federation of one and still go through the processes described below for consistency, given that there is no significant drawback to doing so. When a user invokes an app in the federation, the app connects with the gateway using the methods described above with respect to the per-app VPN embodiments. The app identifies itself to the gateway and goes through Phase 1. The gateway assigns a unique IP address to the app and, in one embodiment, will query whether the app is part of a federation. The app will respond that it is (in this illustration) and the gateway then transmits a federation cookie. The gateway instructs the app to share the federation cookie with the other apps.

In one embodiment, when the app is wrapped, it is configured so that if it receives a federation cookie from the gateway (the app will know how to recognize one when it sees it), the app knows that it should make the cookie available to other apps in its federation. Other apps in the federation which attempt to register with the gateway will be challenged for this federation cookie. If another, subsequently invoked, app has the cookie, the gateway knows it can proceed with manipulating IP addresses and other data in a particular manner described below.

When an app is wrapped, it is configured to be aware that it may be given a federation cookie or that it may have to get a federation cookie (from another app in the same federation) because the app will be challenged for it by the gateway. Essentially, the federated app can be configured during wrap time to be aware of the possibility that it may have to utilize a federation cookie when communicating with the gateway.

In one embodiment, when the gateway gives the federated app that is invoked first on the mobile device a federation cookie, the gateway also gives the app a unique IP address, that is, an IP address that is unique to that mobile device. In addition to these two items—the cookie and the IP address—in one embodiment, it also gives the app a range of ports on the mobile device. This port range is used for communicating data traffic from the source IP (the mobile device) to the destination IP (the gateway) and vice versa.

The app uses this port range to restrict which source port (on the mobile device) to use when sending data from a particular federated app on the device. To illustrate, the gateway may send the app a port range of 100-199. This tells the app that it must use a port in the range of 100 to 199 when it generates and sends traffic over the private VPN connection. In this manner, when the gateway receives traffic from the device and sees that the source port (port on the mobile device) from where the traffic is originating is within the 100-199 range, the gateway knows that the traffic is coming from a specific federated app, even though the IP address is unique only with respect to the device. On the device, the port number that an app will use is assigned to the app by the operating system of the device and that port number is unique to that app.

On the enterprise side of the gateway, where the gateway receives traffic from enterprise servers (e.g., employer's internal network), the gateway can use this port range as a test for the destination port range (on the gateway) which maps to the app on the device. The primary restrictions are that the source port number (on the mobile device) be in the range assigned by the gateway and that no other app on the device use that port number when communicating over the VPN. As noted above, a federation of one app may still be assigned a port range even though it would be sufficient to use the unique IP address.

At this stage a first app in the federation is running and has a secure VPN with the gateway, has a unique IP address, and is transmitting data from a port within a port range as instructed by the gateway. Now a second app in the federation is open. This second app is challenged by the gateway for the federation cookie. Once the cookie is presented to the gateway by the second app, the app is given the same IP address that was given to the first app. The gateway does not have to generate a second unique IP address solely for that second federated app. However, the gateway gives the second app a different port range, e.g., 200-299. When the second app begins sending data through its own private VPN tunnel from a port in the 200-299 port range, the gateway will know that data it receives from any source port in the 200-299 range is from the second app in a specific federation. As noted, the gateway also instructs the second app to ensure that the port the second app uses is unique to that app so the gateway can be confident that traffic it receives that originates from a specific source port is coming from that specific app (i.e., the second app). Only that app will use a port in that range. When the app is closed and is done using the port, the port is closed and the operating system can recycle that port number. The gateway will no longer expect that only that app will use a source port in the 200-299 port range.

Figure 9:
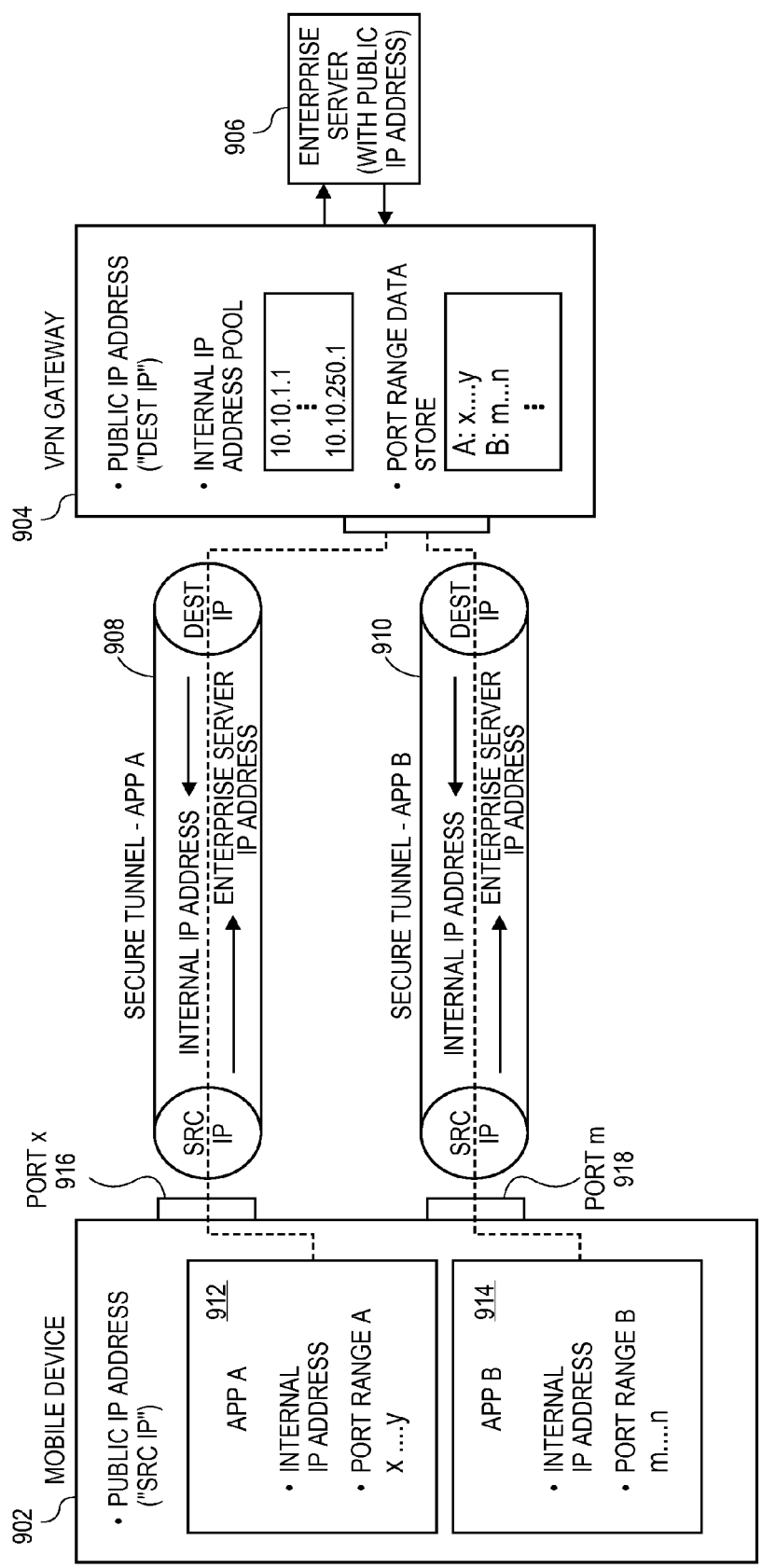
FIG. 9 is a block diagram showing components of a network illustrating various concepts of the present invention.

FIG. 9 is a block diagram showing components of a network illustrating various concepts of the present invention. Shown are a mobile device 902, a gateway 904, and an enterprise (private) server 906. There are two secure tunnels or VPNs 908 and 910 between two apps 912 and 914, respectively, between device 902 and gateway 904.

Mobile device 902 has a public IP address (assigned to it by a public carrier), referred to as the source IP ("SRC IP"). Each of the apps 912 and 914 have an internal IP address and a port range both of which are assigned by gateway 904. Gateway 904 has a public IP address ("DEST IP") assigned by a public carrier, an internal IP address pool, and a port range data store.

There are two VPNs or secure tunnels 908 and 910. VPN 908 connects app 912 through port x 916 on mobile device 902 (port x exclusively for app 912) to gateway 904. Secure tunnel 908 is established or created using SRC IP address and DEST IP address. Similarly, secure tunnel 910 is created using SRC IP and DEST IP addresses and connects app 914 via port m 918 to gateway 904. However, the data that travels in the secure tunnels have addresses consisting of internal IP addresses and an enterprise server IP address which may be characterized as "inside the tunnel" IP addresses. As explained below, data traveling in the secure tunnels are typically between a private enterprise server, such as server 906, and a specific app. Therefore, data transmitted via gateway 904 through a secure tunnel uses the internal IP address of the app and not the public IP address of device 902.

Figure 10:
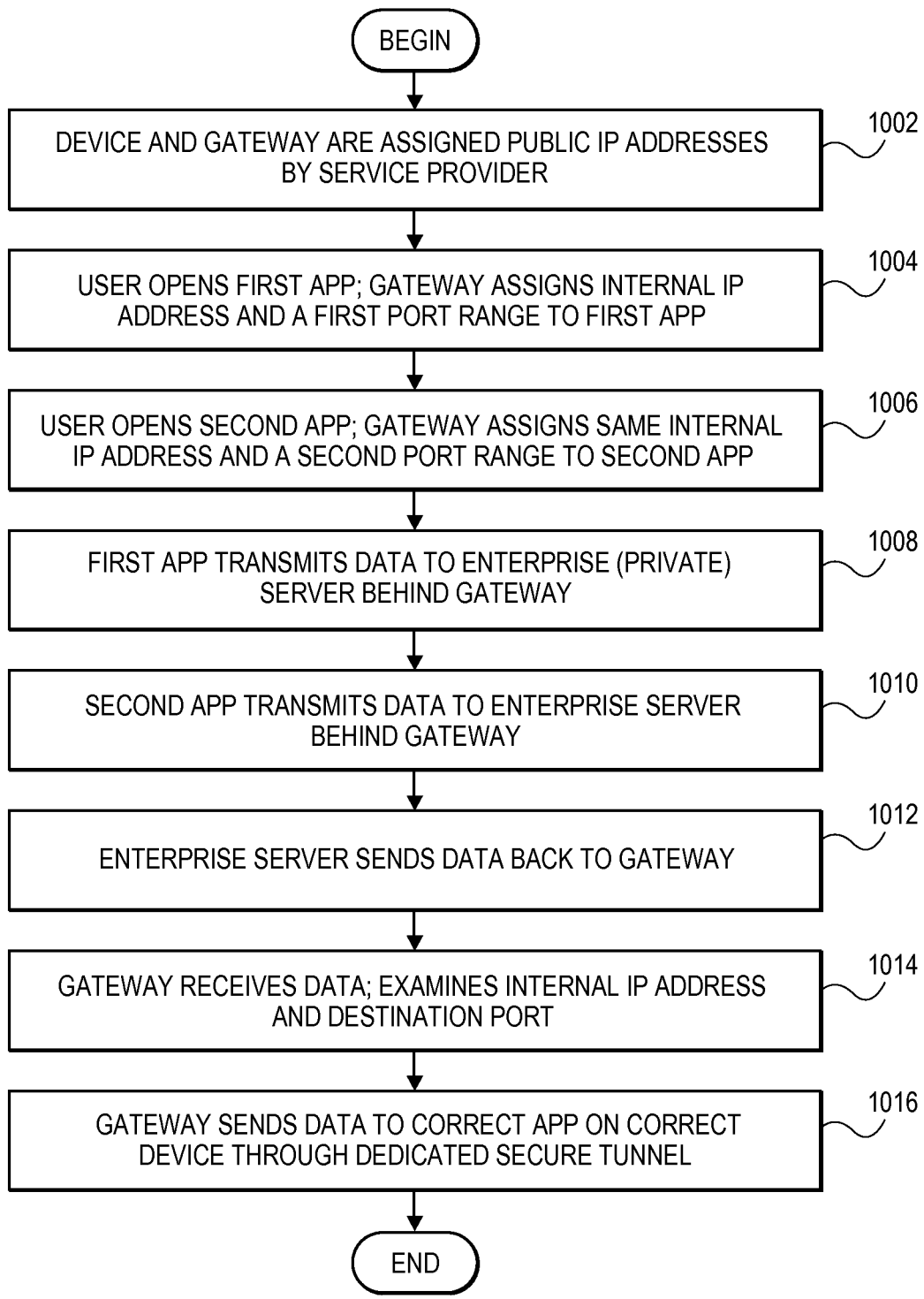
FIG. 10 is a flow diagram of a process executed by the gateway device to determine how to route data back to a specific app from an enterprise server in accordance with one embodiment.

FIG. 10 is a flow diagram of a process executed by the gateway device to determine how to route data back to a specific app from an enterprise server in accordance with one embodiment. At step 1002 the device and gateway are assigned (or have already been assigned) public IP addresses from the enterprise's Internet service provider, such as AT&T or Comcast. The one for the mobile device is the source IP address (SRC IP) and the one for the gateway is the destination IP address (DEST IP).

At step 1004 a user opens a first app on the mobile device. The gateway assigns an internal IP address from its own IP address pool to the first app. It also assigns a port range to the app (referred to herein as "first port range"). The gateway stores these data, specifically, the internal IP address and the port range assigned to the first app in a data store. At step 1006 the user opens a second app on the mobile device. The gateway assigns the same internal IP address to the second app, thereby not having to utilize another internal IP address from the gateway's limited pool of internal addresses. The first and second apps have the same gateway internal IP address. The gateway also assigns the second app a second port range which is different from the port range assigned to the first app. These data are also stored in the gateway. As described below, the data is used by the gateway to perform essentially a reverse look-up to see which app (out of all the apps which were given the same internal IP address by the gateway) should receive the data.

The user executes the first app and the app begins transmitting data to the gateway in route to an enterprise server (related to the app) operating behind the gateway in the private enterprise network at step 1008. At step 1010 the user performs the same with the second app where data is transmitted to an enterprise server (it may be the same one as the first app or another one) behind the gateway. In this example, the two apps send data to the same enterprise server.

At step 1012 the enterprise server sends data back to the gateway. This data may be in response to a request from the first app or from the second app. The private enterprise server itself does not know which app on which device the data should be sent to. It performs no look-ups or any type of address translation. It simply transmits the data back to the gateway, where the data is accompanied by an internal IP address. The data from the enterprise server to the gateway has an internal DEST IP address and a DEST PORT embedded in it (or that of the mobile app which originated the traffic).

At step 1014 the gateway receives the data from the server and examines the internal IP address and destination port of where the data is to be sent. The gateway searches in an internal or otherwise accessible data store to determine that the internal IP address it got with the data from the enterprise server corresponds to a specific federation of apps on the device and uses the destination port to look up which specific app in the federation on the device is supposed to receive the data. In one embodiment the gateway needs both these items—the internal IP address and the port number—to determine specifically which app should receive the data and which security association to use to send the data. At step 1016 the gateway sends data to the specific app through a dedicated secure tunnel between the gateway and the specific app using the app's assigned port on the mobile device.

FIG. 11 is a screen shot of a display showing a VPN gateway active session monitor screen in accordance with one embodiment. A user display 1102 shows various data and information related to users, devices, and apps connected to the gateway. A typical user of an active session query as shown in FIG. 11 may be an enterprise mobile security officer or network security administrator, both interested in learning specific and accurate information about mobile app and data usage in their enterprises.

In screen 1102 are three categories of data: session data 1104 for a selected user; device data 1106, and app data 1108. This information is for a selected user shown in box 1110. Session data 1104 shows information such as username, group, login time and date, length of current session, and the authentication provider. In this case user authentication is provided by using a reconnect token.

Another category of active session data is "Devices Used" shown in box 1106. Shown here is a device identifier (e.g., in some cases a MAC address), the hardware type of the device (which can be a smartphone, tablet, laptop, or other portable computing device), the type of operating system on the device and the version, and the name of the carrier providing the connection, if applicable. The carrier may provide the public IP addresses of the mobile device and the gateway.

The third category is data 1108 describing applications being used by the selected user. This data includes device information (same as the device data shown in box 1106), the name of the application (in this case, a browser app and another app called "NSLookup") and related app information. This may include a package ID, UUID, and a Session ID. Recall that the apps that are monitored using the VPN gateway are security wrapped using the processes described above in FIGS. 1-6. As such, also provided is app security software version information used to wrap the app listed in box 1108. All this information provides in-depth detail that is based on actual app usage in the enterprise: who is using which apps (and what version of those apps) on which devices (and what is the state of those devices) and for how long.

In yet another aspect of the present invention, issues of authentication at three levels are addressed: the user level, the device level, and the (wrapped) app level. More specifically, authentication and related functionalities are between each of these levels or nodes and VPN gateway server 708, described above. In one embodiment, gateway 708 is supplied to an enterprise by the same security provider providing the app wrapping software described in FIGS. 1-6.

In one embodiment of the present invention, the enterprise network performs three levels of authentication using gateway 708. This includes authenticating apps that are being used on the device. However, the present invention specifically extends to authentication of secured apps on the device.

This granularity of authentication, authenticating at the app level, could not be done using conventional user and/or device authentication means.

Unlike device-level security providers, app-level authentication is enabled in the present invention via app wrapping and VPN gateway component provider, such as Mocana Corporation, has detailed data of the actual secured app that is executing. The provider can be described as being "in the app" and is very familiar with the app process space; it has inherent knowledge of the wrapped app. In this manner, the enterprise, by virtue of the gateway component, can authenticate details about specific app usage, as described below.

In one embodiment, authentication is extended using policy enforcement and reporting protocol (PERP), the protocol described above. PERP is expanded to enable app-level authentication by the gateway component. This may be referred to as "triple tier authentication." In one embodiment, wrapped apps running on a device attempting to access internal resources in an enterprise are authenticated. The information reported from the mobile device to the gateway may include, for example, app package ID, app version, security wrapping software version, a unique platform identifier, and other data as needed. These data collectively provide a unique ID or fingerprint of the secured app executing on the device. As such, the security program on the gateway is able to strongly authenticate apps. It is also able to obtain information about app usage, for example which version of the wrapped app is being used and statistics, for example, how many users are executing the most recent version of the wrapped app, how often, where, and other data.

Figure 12:
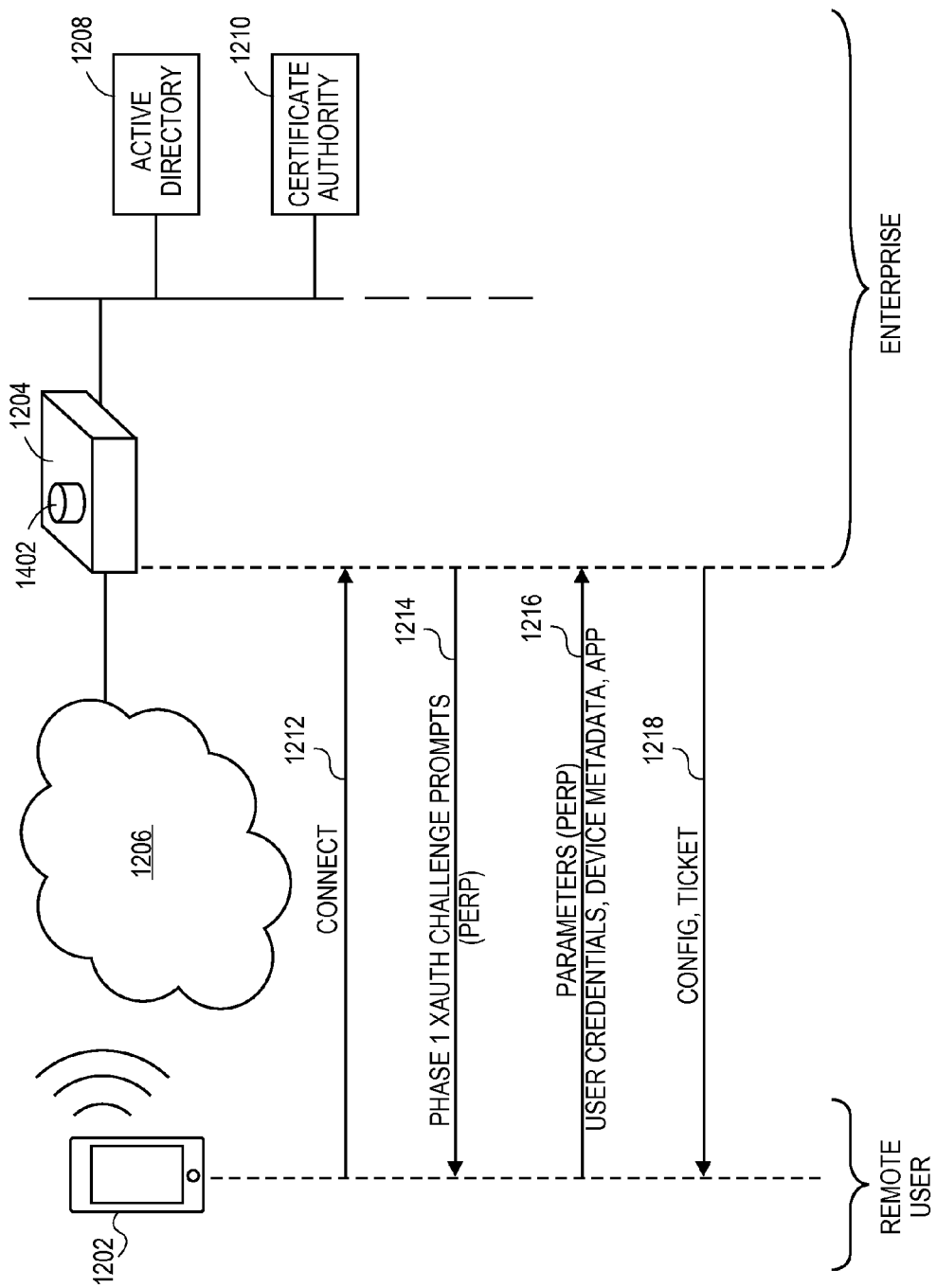
FIG. 12 is a network diagram showing some steps during this IKE Phase 1 in accordance with one embodiment.

The processes described herein occur when a device is attempting to establish a secure tunnel between the mobile device and the gateway, specifically during IKE (Internet Key Exchange) Phase 1, as described above. FIG. 12 is a network diagram showing some of the steps during this phase in accordance with one embodiment. A mobile device 1202 connects to a gateway component 1204 via Internet 1206 as shown by arrow 1212. Gateway component 1204, in turn, is in communication with, for example, an Active Directory server 1208 and any other enterprise Web servers, such as certificate authority server 1210. These servers are "behind" gateway 1204 in the enterprise network.

Once the connection between device 1202 and gateway 1204 is made, the process continues with IKE Phase 1 XAUTH which includes PERP parameters, such as challenge prompts, transmitted from gateway 1204 to device 1202 as shown by arrow 1214. Mobile device 1202 then sends its PERP parameters, including user credentials, device metadata, and app identification, back to gateway component 1204 as shown by arrow 1216. Gateway component 1204 then sends messages back to mobile device 1202 including configuration data and ticket as shown by arrow 1218.

Figure 13:
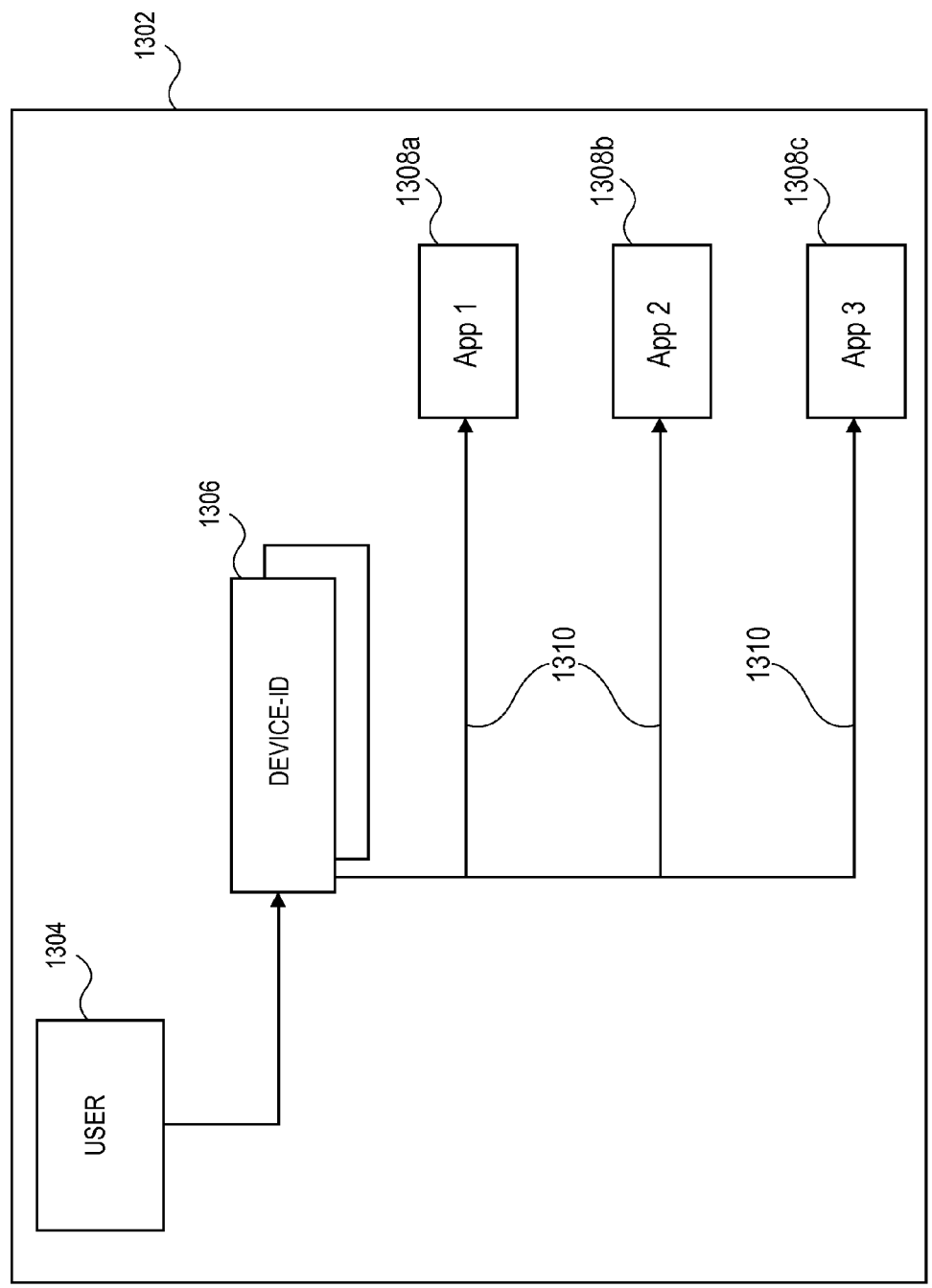
FIG. 13 is a block diagram of a gateway component having multi-tier database structured as a tree of nodes representing user, device, and secured app in accordance with one embodiment.

In one embodiment, a multi-tier database 1302 is stored on gateway component 1204. FIG. 13 is a block diagram of a gateway component 1204 having multi-tier database 1302 structured as a tree of nodes representing user, device, and secured app in accordance with one embodiment. Database 1302 stores the various data needed for the triple tier authentication of the present invention.

At the backend of gateway component 1204, conventional means are used to connect to the authentication servers, such as Active Directory server 1208 or any other relevant corporate servers, such certificate servers 1210, SSO identity systems, and others, to authenticate the user. This is to ensure that the user is still authorized (e.g., employed at the enterprise or still a contractor with the enterprise, retired employees, and the like) and is allowed to access the gateway, and the like. For example, if the user was terminated or a consultant contract expired, the authentication would fail.

In one embodiment, a first tier of records 1304 in database 1302 relates to the user and contains conventional data relating to users in an enterprise. It is used to authenticate a user with, for example, AD server 1208 or other local source.

A second tier of nodes, shown as tier 1306 of database 1302 represents mobile devices in the network. In the current "bring your own device" environment that many employees are in, each user typically has one mobile device but may have more. Tier 1306 shows that each user may have one or more devices. Conventionally, a mobile device is authenticated when it attempts to access the network. As such, device authentication takes place when the device first makes contact with gateway component 1204 and the initial exchanges of IKE Phase 1 take place. This is when the device first attempts to create a VPN with the gateway. This enables transmission of confidential messages between the gateway and the device (but is not yet the secure tunnel needed for transmitting full network packets). At this stage various device authentication steps take place, such as checking the device identifier and verifying the operating system version.

Conventionally, when a client device is authenticated, the gateway software authenticating the device to the enterprise grants network access to all apps installed on the device; all the apps are given access to the enterprise network (the software does not distinguish between trusted and untrusted apps). Conventionally, the enterprise gateway device does not have access to the process space of an executing app on the client device. As noted, the enterprise cannot differentiate between trusted and untrusted apps; all apps are given access to the network.

However, in the various embodiments of the present invention, the enterprise gateway component establishes a dedicated link coupling the gateway device and a specific executing app. Prior to this app-specific link being established, the gateway device collects information and stores it in database 1302, including information about the user, device, and the specific application. In accordance with one embodiment, authentication is performed at each level. For example, the user is authenticated by virtue of having possession of credentials that match enterprise, for example, Active Directory credentials. The client device is authenticated by policy that may include, for example, verifying that it has not been jail broken or compromised. Finally, the individual app may be authorized by having the app present a digital certificate that is stored in encrypted, on-device storage that is only accessible by apps in a trusted federation. The information in database 1302 stores information collected from the user at node 1304, from the device at node 1306, and from the individual apps that are within the same trusted federation at nodes 1308a-c.

User information may include time of login, authentication provider, and username. Device information may include unique identifiers such as MAC address or advertising ID, OS type, OS version, manufacturer, and model number. App information may include app name, app version, wrapping software version, and app-unique ID. All apps within the same federation can share data scoped to the federation, such as single-sign on (SSO) tokens for the gateway device or other enterprise services.

As noted, in one embodiment, a link or nexus is established in database 1302 between a device and the secure apps executing on that device as shown by arrows 1310. This link gives network administrators the ability to track all app usage information analytically. For example, administrators are able to use real-time/live information for monitoring and troubleshooting. The link enables logging for auditing and aggregating historical information. This will also facilitate usage-based chargebacks in an enterprise. That is, charge back mobile infrastructure costs to specific business lines based on demonstrated usage information. By virtue of being end-to-end (from app to gateway), the database and links (platform) described herein exposes previously opaque telemetry data for an enterprise's mobile infrastructure. For example, there are at least three mobile app usage intelligence use cases: security, application lifecycle management, and IT operations.

In security, the triple-tier authentication platform allows for monitoring anomalous behavior and correlating mobile user/usage information with other systems for richer analytics. App lifecycle management allows for developers to build better mobile apps based on insight into mobile usage patterns. For example, they may see that users are using the desktop version of an app for a specific function and the mobile version of the app for all other functions. This tells the developers that they should think about building better functionality for that specific function into the mobile version of the app. Because security software on gateway component 104 tracks app activity on the devices, it can provide precise and accurate analytical data. For example, it can show which apps cause bottlenecks, which app upgrades were implemented by users, which apps are most often used, and the like.

As described above, there are three levels of trust using database 1302 node structure of the present invention. In one embodiment, the three tiers are stored and implemented on the gateway component as shown in the figures. In another embodiment, as part of the authentication of a user using Active Directory, the system gives the user a ticket. This is the first step in a single sign-on (SSO) approach to authenticating a user/device/app. In one embodiment, the SSO is tied with the app layer. The ticket can be used for subsequent authentication of a user with other components, e.g., Web servers 110. The ticket is transmitted as part of a PERP payload shown in step 118. It is used as a symbol of trust from, in this case, Active Directory. As such, when the user or a device communicates with other Web servers, they know that the user has already been authenticated by Active Directory.

Figure 14A:
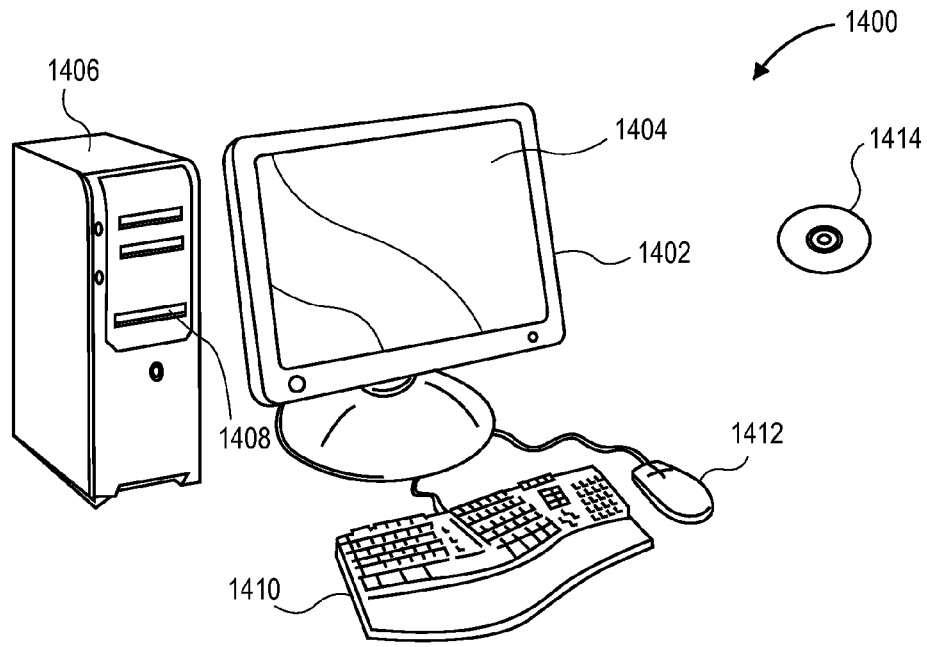
FIGS. 14A and 14B are block diagrams of a computing system suitable for implementing various embodiments of the present invention.
Figure 14B:
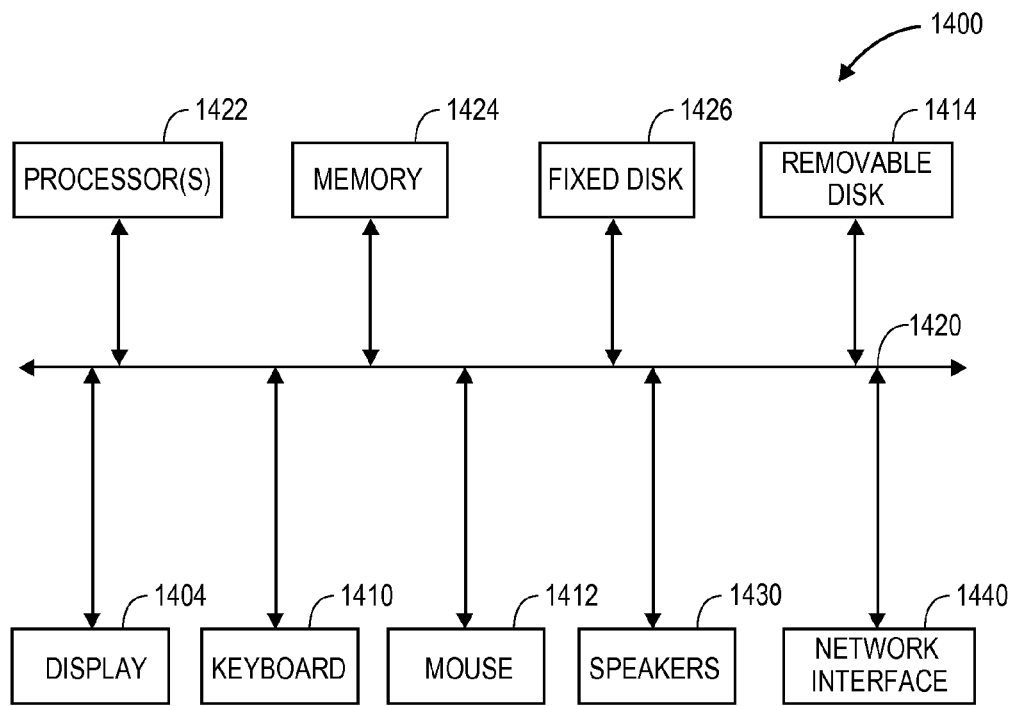

FIGS. 14A and 14B illustrate a computing system 1400 suitable for implementing embodiments of the present invention. FIG. 14A shows one possible physical form of the computing system. Of course, the computing system may have many physical forms including an integrated circuit, a printed circuit board, a small handheld device (such as a smartphone or tablet), a wearable device, a personal computer or a super computer. Computing system 1400 includes a monitor 1402, a display 1404, a housing 1406, a disk drive 1408, a keyboard 1410 and a mouse 1412. Disk 1414 is a computer-readable medium used to transfer data to and from computer system 1400.

FIG. 14B is an example of a block diagram for computing system 1400. Attached to system bus 1420 are a wide variety of subsystems. Processor(s) 1422 (also referred to as central processing units, or CPUs) are coupled to storage devices including memory 1424. Memory 1424 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1426 is also coupled bi-directionally to CPU 1422; it provides additional data storage capacity and may also include any of the computer-readable media described below. Fixed disk 1426 may be used to store programs, data and the like and is typically a secondary storage medium (such as a hard disk) that is slower than primary storage. It will be appreciated that the information retained within fixed disk 1426, may, in appropriate cases, be incorporated in standard fashion as virtual memory in memory 1424. Removable disk 1414 may take the form of any of the computer-readable media described below.

CPU 1422 is also coupled to a variety of input/output devices such as display 1404, keyboard 1410, mouse 1412 and speakers 1430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1422 optionally may be coupled to another computer or telecommunications network using network interface 1440. With such a network interface, it is contemplated that the CPU might receive information from the network, or might output information to the network in the course of performing the above-described method steps. Furthermore, method embodiments of the present invention may execute solely upon CPU 1422 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

What I claim is:

1. A method of communicating through a virtual private network (VPN) tunnel between a first app on a device and a VPN gateway, the method comprising:

connecting to a gateway component having a database with nodes for user, device, and apps providing triple-layer security for app usage;

authorizing the first app by having the first app present a certificate stored on the device;

transmitting challenge parameters from the VPN gateway to the device;

transmitting mobile device parameters including user credentials, device metadata, and first app identification, to the VPN gateway component, thereby authenticating the first app with the VPN gateway;

transmitting an internally unique internet protocol (IP) address from the VPN gateway to the first app;

transmitting an app federation cookie from the VPN gateway to the first app after determining that the first app is in a federation of wrapped apps on the device;

sharing the app federation cookie with a second app in the federation of wrapped apps;

assigning the second app the same internally unique IP address;

receiving, at the VPN gateway, a data transmission from the first app; and transmitting a first range of ports to the first app, wherein the first asp uses a port in the first port range as a source port for data transmission from the first app to the VPN gateway, wherein the first port range comprises a plurality of ports not included in a second port range transmitted to the second app having the same internally unique IP address as the first app.

2. A method as recited in claim 1 further comprising:
receiving a ticket at the first app as a parameter from a user authentication server behind the VPN gateway.

3. A method as recited in claim 2 further comprising:
using the ticket to subsequently authorize the user with other components behind the VPN gateway.

4. A method as recited in claim 1 further comprising:
tracking first app usage by examining a link in the database between apps and the device, thereby providing first app telemetry data.

5. A method as recited in claim 4 further comprising:
enabling usage-based chargebacks for mobile infrastructure costs by examining first app telemetry data.

6. A method as recited in claim 4 further comprising:
detecting anomalous behavior in first app usage.

\* \* \* \* \*